United States Patent [19]
Zabel

[11] 4,051,998
[45] Oct. 4, 1977

[54] DIGITAL ELECTRONIC DATA SYSTEM FOR A FLUID DISPENSER

[75] Inventor: William P. Zabel, Fort Wayne, Ind.

[73] Assignee: Tokheim Corporation, Fort Wayne, Ind.

[21] Appl. No.: 538,888

[22] Filed: Jan. 27, 1975

Related U.S. Application Data

[63] Continuation-in-part of Ser. No. 380,944, July 20, 1973, abandoned.

[51] Int. Cl.² .......................... B67D 5/08; G06F 15/20
[52] U.S. Cl. ............................... 364/465; 235/92 FL; 222/23
[58] Field of Search ......... 235/151.34, 92 FL, 92 PE, 235/92 DM, 92 CC; 222/23

[56] References Cited

U.S. PATENT DOCUMENTS

| | | | |
|---|---|---|---|
| 3,081,031 | 3/1963 | Livesay | 235/160 |
| 3,654,449 | 4/1972 | Boyce | 235/92 |
| 3,666,928 | 5/1972 | Burke et al. | 235/92 FL |
| 3,751,642 | 8/1973 | Todd et al. | 235/151.34 |
| 3,765,567 | 10/1973 | Maiocco, et al. | 222/30 |
| 3,781,534 | 12/1973 | Bruce-Sanders | 235/151.34 |
| 3,809,866 | 5/1974 | Scoville | 235/151.34 |
| 3,813,527 | 5/1974 | Langston | 235/151.34 |
| 3,821,537 | 6/1974 | O'Keefe | 235/151.34 X |

Primary Examiner—Edward J. Wise
Attorney, Agent, or Firm—Lundy & Welch

[57] ABSTRACT

A digital electronic data system for use with a fluid dispenser which includes means for generating an electrical signal in response to each incremental quantity of fluid dispensed, the data system comprising manually setable register means for generating a static electrical signal representative of the unit price of the fluid being dispensed, computing means coupled to the dispenser signal generating means and the static unit price signal generating means for receiving the afore-mentioned signals and generating in response thereto signals representative of the quantity and cost of fluid dispensed. A data transfer means is connected to the computing means for receiving and accumulating static unit price, accumulated volume and price signals and transmitting the same serially through a signal transmitting medium. Data display means are connected to the transmitting medium for receiving the sequentially transmitted signals and generating a display thereof representative of the unit price, accumulated volume, and cost of fluid dispensed.

41 Claims, 12 Drawing Figures

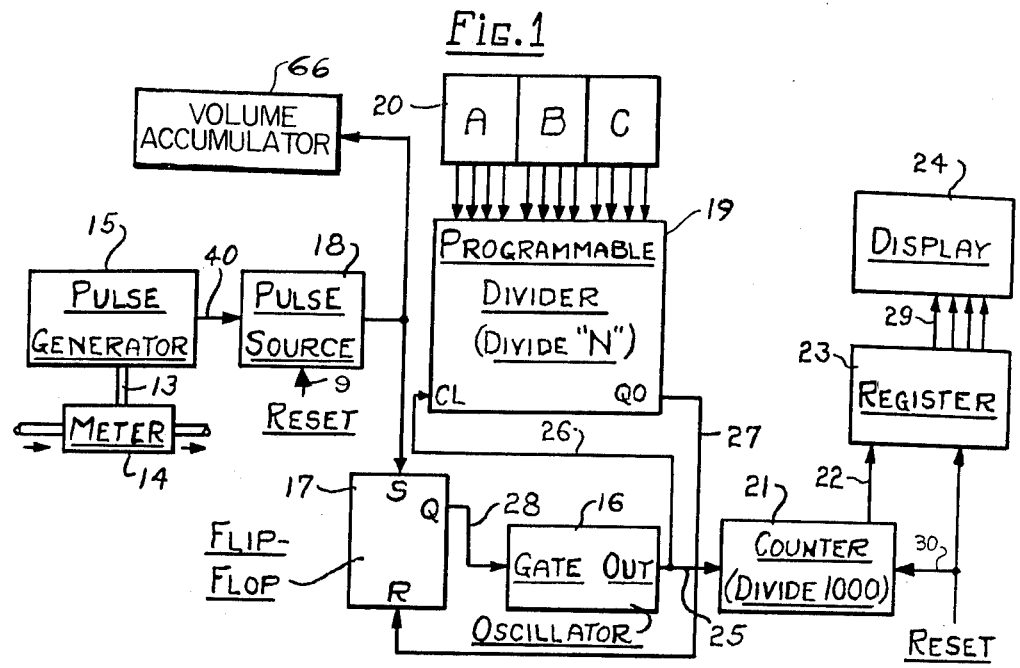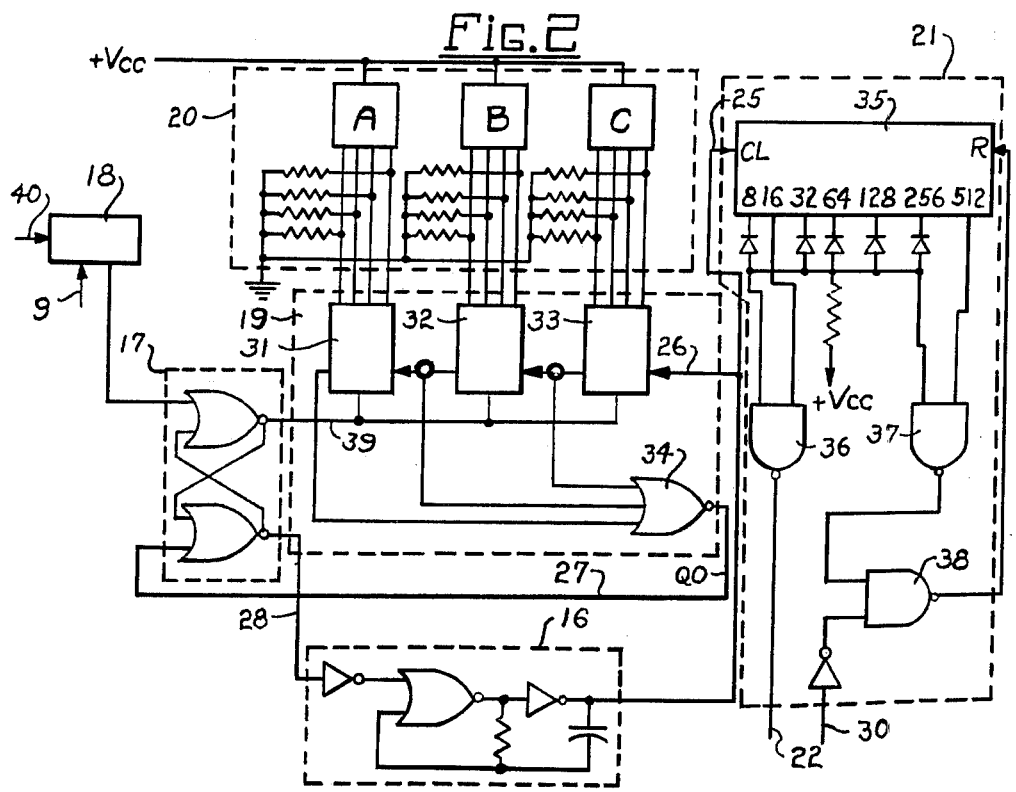

DIGITAL ELECTRONIC DATA SYSTEM FOR A FLUID DISPENSER

This application is a continuation-in-part of U.S. patent application Ser. No. 380,944, filed July 20, 1973, now abandoned.

BACKGROUND OF THE INVENTION

1. Field of the Invention

The present invention relates to fluid dispensers and in particular to a digital electronic data system for use in a fluid dispenser which includes means for setting unit price, computing the cost and quantity of fluid dispensed, and transmitting the data between dispenser, computing circuits, and display circuits with a minimum of interconnecting transmission means.

2. Description of the Prior Art

Presently, the computing of the delivery cost in a retail gasoline dispenser is almost exclusively accomplished by a mechanical variator. The computing function, whether accomplished mechanically or electronically by such a fluid dispenser, is nothing more than a multiplication of a presettable, variable quantity representing the cost per unit volume (usually cents/gallons) and a variable quantity representing cumulative volume of liquid actually dispensed (usually gallons); the product of these two quantities is the cost of liquid dispensed (usually dollars and cents).

The mechanical variator, driven by a flow meter through which all of the liquid being dispensed is passed, contains an elaborate gearing arrangement to accomplish this multiplication operation. By the use of gearing to drive a plurality of number wheels whose outside periphery is displayed through square openings in the dispenser face, the computer settings and outputs may be observed by the operator and customer. Usually, the display includes not only the cost of liquid dispensed, but the preset delivery cost of such liquid and the amount of liquid actually dispensed.

The mechanical system's computing function is entirely dependent upon the relative gear ratios within the computer between the preset unit volume price element and the amount of liquid dispensed element. The presettable unit volume price capability consists of nothing more than a means to physically shift the gearing within the computer, thereby varying the gear ratios to effect the desired result as exemplified in the computer output.

Because the computing function is performed by a mechanical apparatus, it is further common practice to provide a mechanical computing apparatus in each individual fluid dispenser in a particular installation. When it becomes necessary to alter the cost per unit volume, it is necessary for the station operator to alter the cost per unit volume settings in each individual dispenser. This operation requires the opening of a plurality of housings, and the maintenance of an inventory of change gears.

The mechanical systems and even more recent electronic fluid dispensers utilize an individual computing device in each fluid dispenser. Accumulation and transfer of data automatically from the dispensers to a remotely located receipt printing device, display console or the like have not been practical.

While such arrangements as the mechanical variator are satisfactory, it has been found that there are serious limitations which have, in the light of modern petroleum marketing technology, dictated the need for a device with flexibility both in the outward design appearance and in the inherent theory of operation. To this end, fluid dispensers with electronic computing elements and displays have recently become known in the art, such as exemplified by U.S. Pat. No. 3,813,527, issued May 28, 1974 to Earl M. Langston and assigned to the assignee of the present invention. While such arrangements have effected significant improvements these prior art systems still present problems.

For example, an all electronic fluid dispenser will more likely than not be installed in an already existing facility such as a gasoline service station or the like. Since most of these installations have been constructed to utilize mechanical fluid dispensers, the electrical wiring for the individual dispensers is typically routed through relatively small ($\frac{3}{4}$ inch diameter) electrical conduits or the like since the only electrical connections required have typically been those for conventional 110 volt alternating current. The conduits are typically encased in the pavement of the facility and removal or installation of additional conduits is costly. Correspondingly, electronic fluid dispenser systems as above-referenced have presented a significant difficulty in that they have required the installation of multiple conductor data lines or cables which frequently cannot be installed in existing conduits. Such systems have therefore been found to need improvements to provide simplicity in the theory of operation, the utilization of fewer parts in order for such a device to be price competitive with the mechanical value register and circuitry which will enable the transmission of data between fluid dispensers and a centrally located computing device and back to electronic displays with a minimum number of conductors.

SUMMARY OF THE INVENTION

Broadly, the present invention is a digital electronic data system for a fluid dispenser which incorporates a simplified computing circuit incorporating a gated oscillator and a data transmitting system which effects serial transmission of cost per unit volume, volume dispensed, and cost of fluid dispensed data with a minimum of innerconnecting wiring, provides centralized display of all transaction parameters, enables automatic printing of receipts and the like. The entire circuit is suited for fabrication from commercially available integrated circuits thereby realizing considerable savings over both the mechanical and prior art electronic fluid dispensing systems.

Another advantage of the present system is that it provides a simple method for changing the unit volume price (price per gallon) of the liquid being dispensed by using electrical switches, for example, BCD (Binary Coded Decimal) Rotary switches with integral digital numerical readouts. The price per gallon signal to the computer can be instantaneously varied from inside the station or other remote location. The complicated mechanical assemblies found in the mechanical value register are eliminated. By replacing the mechanical value register with a computer that can interface with electronic digital type displays such as liquid crystals, light emitting diodes, incandescent bulbs, etc., variations in the price setting displays may be made directly by the use of electrical switches. The present system using this type of display also lends itself to accurate roundoff by presenting all data in exact integer values and thereby eliminating estimated rounding off by an attendant who, with present systems, must view the position of a rotating wheel.

By using wire interconnections between components, the computer may be located remote from the dispenser. This enables the price per gallon selector switches, ideally located at the computer, to be physically located within the station house. This further enables the switches to be mounted directly to the circuit boards of the computer, thereby eliminating complex and difficult hard wiring between the switches, remote fluid dispensers, and control units. With the switches conveniently located, the price per gallon display at the dispenser may be easily varied.

Additionally, another inherent problem posed by mechanical value registers and some electronic computers is accuracy. Presently, the government regulatory agencies have a 3 cubic inch per 5 gallon delivery tolerance. This represents an approximate one quarter percent accuracy, sometimes close to the limits of a mechanical value register. Thus, with the increased concern for consumer protection, more accuracy may be needed. The present invention, presents novel improvements which effect an accuracy capacity considerably better than presently available. The system is further adaptable for operation using the monetary systems of different countries as well as being readily adaptable to metric system computations. The only variation required in most instances is the selection of an appropriate nameplate designation for the unit volume price and alteration of the number of pulses per unit volume used.

Since wires rather than mechanical linkages between components are utilized, the ornamental design configuration of a fluid dispenser is no longer limited by the traditional concept of the dispenser pedestal as presently known thus allowing for virtually unlimited design options.

The present system is further desirable for petroleum industry marketing programs by reason of its ability to interface with wide area inventory control systems incorporating such features as computerized billing and marketing research. Such systems can be directly interfaced with the present invention since both use binary coded electronic signals. The interface does not require any conversion or transducing function to be performed as between the mechanical and electronic systems.

Because of its nature and simplicity, a system utilizing circuits as disclosed herein is adaptable to fabrication using modern integrated circuit techniques, thus providing a reduction in the cost of manufacture. By the use of such modern techniques, the entire package can be mounted on a few printed circuit boards thereby eliminating the upper two-thirds of a conventional liquid dispenser pedestal. This type of circuitry and fabrication further reduces maintenance, down time, and increases reliability thus permitting troubleshooting type maintenance by merely plugging a replacement printed circuit board in place of a defective unit, the latter being repaired at the factory by experienced personnel with adequate test equipment.

The present invention provides a relatively simple apparatus readily adapted for economical conversion of existing above-ground dispenser pedestals with mechanical variators to solid state computer type systems.

It is therefore an object of the invention to provide a low cost digital electronic display system for use in a gasoline dispenser as a replacement for present fluid dispensers with individual mechanical variators and value registers.

Another object of the present invention is to provide a new and improved computer for producing an output which is the product of a variable preset cost per unit volume signal and a second signal, for example, the delivery of a determined quantity of liquid.

It is a further object of the present invention to provide a new and improved electronic cost computer employing conventional logic components.

Yet another object of the present invention is to provide a system whereby the price per gallon can be easily and conveniently changed.

Still another object of this invention is to provide a system which can, with a minimum of modification, be interfaced with peripheral data processing equipment.

Another object of the present invention is to provide a data system for a fluid dispenser which enables serial transmission of binary coded data between a plurality of fluid dispensers, a remotely located computing device, and back to the dispensers with a minimum number of interconnecting wires.

Yet another object of the invention is to provide a digital electronic fluid dispenser data system which can be fabricated substantially from commercially available solid state components.

Another object of the invention is to provide such a data system which includes means for automatically printing receipts and similar data.

Still another object of the present invention is to provide a data system which effects a substantial reduction in the number of components required for a multiple dispenser installation.

Yet another object of the invention is to provide such a data system which minimizes the length and number of interconnecting hard wires and reduces the possibilities of noise, interference, and erroneous operation.

Still another object of the invention is to provide such a data system which includes automatic self-checking and synchronizing features.

The above-mentioned and other features and objects of this invention and the manner of attaining them will become more apparent and the invention itself will be best understood by reference to the following description of an embodiment of the invention taken in conjunction with the accompanying drawings, wherein:

BRIEF DESCRIPTION OF THE DRAWINGS

FIG. 1 is a simplified block diagram of the cost computing circuit in accordance with the present invention;

FIG. 2 is an electrical schematic of an embodiment of the computing portion of the circuit of the present invention;

DESCRIPTION OF A SPECIFIC EMBODIMENT

Figure 3:
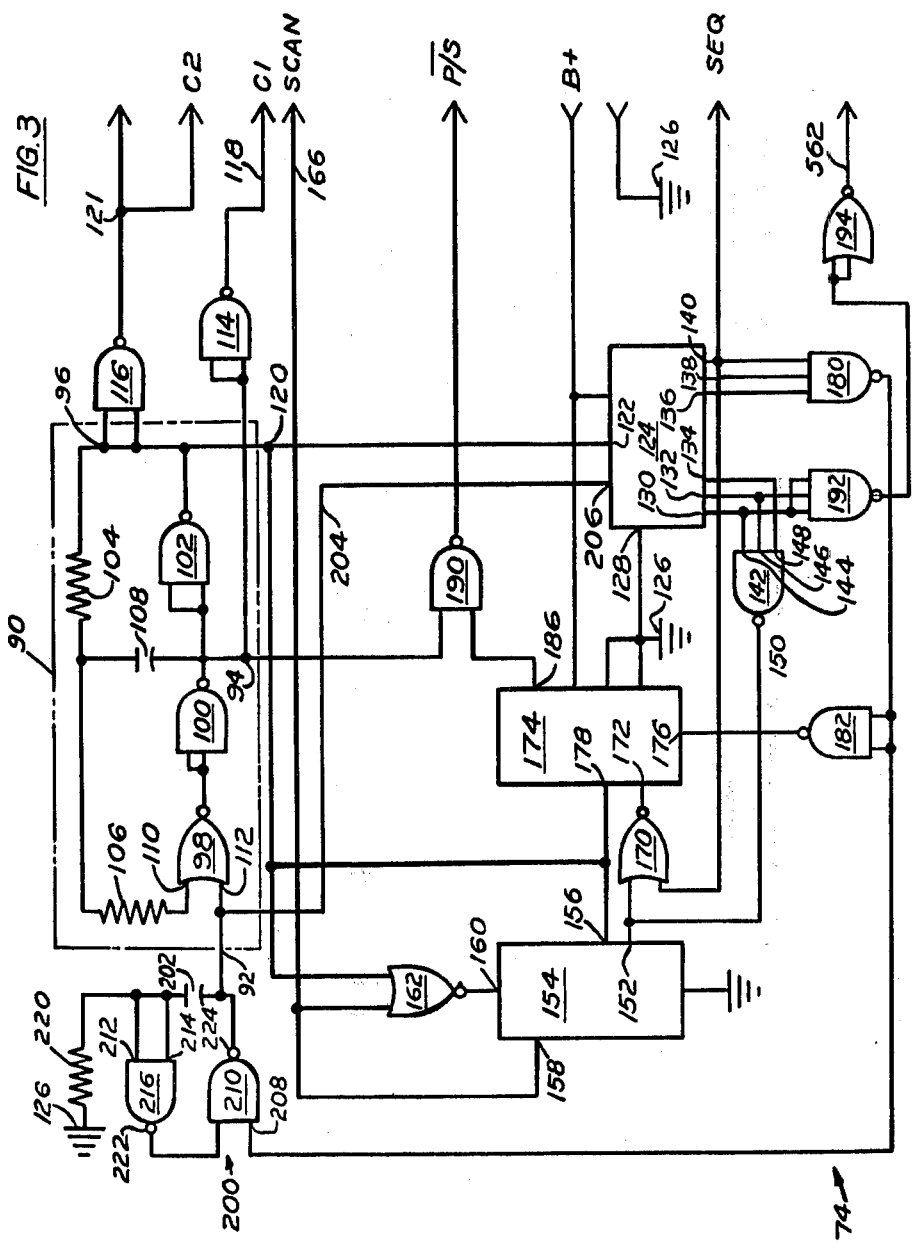
FIG. 3 is an electrical schematic of the control signal and synchronizing circuitry for use with the present invention.

In FIG. 1, there is shown a simplified block diagram of a control device embodying the invention into a liquid dispenser. To describe it more fully, the liquid dispenser 10 utilizes a conventional type flow meter 14 through which all of the liquid being dispensed passes and which has an output shaft 13 mechanically connected so as to drive a pulse generator 15 as a direct function of a preselected quantity of liquid dispensed. One form of a suitable pulse generator 15 is a photo electric pulser, being nothing more than a disc containing a plurality of apertures, a light emitting diode, and a photo transistor. As the disc rotates, the apertures alternately allow the transistor to become irradiated by the diode; the transistor saturates and emits a pulse signal. Such a system is more fully described in U.S. Pat. No. 3,813,527, issued May 28, 1974 to Earl M. Langston and assigned to the assignee of the present invention. It should be apparent that by changing the drive ratio and the number of apertures in the disc, the number of delivery pulses per a given unit volume of liquid can be varied. One pulse for each one thousandth of a gallon of liquid dispensed has been found highly suitable; and therefore, this component produces 1000 pulses for each gallon dispensed.

Each delivery pulse from the pulse generator 15 is fed to pulse source 18 that is actually a divide-by-ten divider which, in response to each group of 10 pulses from pulse generator 15 produces a delivery pulse to establish a set condition on flip-flop 17 and thereby initiates the following chain of events: high frequency oscillator 16 which has previously been inhibited by flip-flop 17 is allowed to begin oscillation upon receipt of a signal through wire 28, indicating a stable set condition of flip-flop 17, and coincidental therewith the high frequency pulses from oscillator 16 are delivered to a programmable divider 19 and a divide-by-one-thousand counter 21 through wires 26 and 25 respectively. A certain integer "N", representing the unit volume price, has been established by thumbwheel switches 20 ($N = 100A + 10B + C$, wherein "C" is the tenths selector setting, "B" is the unit selector setting, and "A" is the tens selector setting of thumbwheel switch 20). This information is programmed into programmable divider 19 in such a manner as to permit it to count the input pulses and to produce a single feedback pulse at terminal Q upon completion of the "N"th pulse represented from the oscillator 16 to the input terminal CL. The feedback pulse travels along wire 27 to flip-flop 17, producing a stable reset condition in said flip-flop which in turn causes oscillator 16 to cease producing. This reset condition of flip-flop 17 enables it to receive another delivery pulse and restart the counting sequence.

Meanwhile, divide-by-one-thousand counter 21 has accumulated a total of "N" pulses. The output of counter 21 is so configured as to present a single pulse to output wire 22 each time said counter reaches a condition which is midway through the counting cycle of one thousand pulses; midway corresponding to an accumulation of a count of five hundred away from the reset condition of zero.

It is easily seen that since the integer "N" represents the price per gallon setting (unit volume price), each pulse transmitted along output wire 22 represents the delivery of a base unit increment (1 cent) worth of fluid having been dispensed, and the accumulation of these pulses by register 23 is transmitted by wires 29 to display 24 representing the total value of fluid dispensed to the nearest cent. Noteworthy is the fact that divide-by-one-thousand counter 21 can be made to perform its rounding off function slightly before or slightly after the exact half cent by programming its output for the four hundred and ninety-nine, five hundred or five hundred and first pulse respectively.

Referring now to the electrical schematic FIG. 2, wherein all logic elements not otherwise designated are the complementary MOS variety, pulse source 18 is ideally a decade counter which accepts pulses through wire 40 from a one thousand pulse per gallon pulse generator 15 (shown in FIG. 1) and which delivers a pulse to flip-flop 17 every tenth input pulse, i.e., every one one-hundredth of a gallon (a single unit quantity). Since such a decade counter can be electrically reset through wire 9, the necessity of mechanically resetting the pulser as required in a conventional value register is eliminated, assuming a maximum permissible volume error of one one-thousandth of a gallon is tolerable.

Flip-flop 17 consists of two NOR gates connected in the familiar RS flip-flop configuration, and oscillator 16 is a conventional C/MOS astable multivibrator with provisions for forcing and maintaining its output in the logic 1 state by the application of a logic 0 to wire 28, the gate terminal.

Programmable divider 19 consists primarily of presettable binary coded decimal (BCD) up-down counters 31, 32 and 33 cascade-connected in the down-counting mode so as to receive counting pulses from oscillator 16. BCD thumbwheel switch 20 provides the BCD presetting information "N" which is constantly presented to the presetting inputs of the registry means, programmable divider 19, but which is accepted by (allowed to preset) the counters only upon the application of the logic 1 on "preset" enable wire 39.

In the idle condition, "preset" enable wire 39 is at logic 1 and wire 28 is at logic 0. When flip-flop 17 is set by a pulse from pulse source 18 signifying the deliverance of one hundredth of a gallon of liquid, wires 39 and 28 reverse their conditions, which cause, respectively, up-down counters 31, 32 and 33 to return from the presetting to the down-counting mode, and oscillator 16 to begin oscillation with a negative-going transition from logic 1 to logic 0. Since up-down counter 33 is incremented by a positive-going transition on wire 26, the first down-count will take place one half an oscillation period following the commencement of oscillation, which gives the down-counter time to change modes. The "carry" output from each up-down counter 31, 32 and 33 assumes a logic 0 condition only when the counter is in a condition corresponding to a decimal 0; hence, the positive-going transition of the carry output which occurs when a counter is incremented from decimal 0 to decimal 9 is used to increment the following down-counter decade. Since all three "carry" outputs from each up-down counter 31, 32 and 33 will be at logic 0 when the wire 26 has undergone "N" positive-going transitions (corresponding to "N" complete cycles of oscillator 16) these three outputs are logically ANDed together with NOR gate 34, whose output is used to reset flip-flop 17 through wire 27.

Note that when this occurs it is permissible for the set input of flip-flop 17 not to have returned to logic 0. In this event, the flip-flop 17 assumes an "invalid" condition in which both inputs are logic 1 and both outputs are logic 0. However, a logic 0 on wire 28 inhibits the oscillator, and programmable divider 19 cannot advance from the 000 count to the 999 count; nor can the counters comprising the divider be preset until "preset" enable wire 39 returns to logic 1. Thus, the system can remain "latched-up" until the set input of flip-flop 17 returns to logic 0, whereupon the up-down counters 31, 32 and 33 are again present. Disappearance of the 000 count causes the output of NOR gate 34 to return wire 27 to the logic 0 state which prepares the flip-flop 17 for another "set" command from pulse source 18. This is desirable in that it eliminates the need for a one-shot multivibrator between pulse source 18 and flip-flop 17.

Also note, that if 000 is preset by thumbwheel switch 20, oscillator 16 will never be allowed to oscillate.

Divide-by-one-thousand counter 21 consists of a resettable binary ripple counter 35 and several NAND gates 36, 37 and 38. Ripple counter 35 is incremented by a negative-going transition on wire 25, and is made to cycle every one thousand counts through the decoding of the binary equivalent of one thousand with the diodes depicted, in conjunction with NAND gate 37. This decoded count, which occurs on the one thousandth negative-going transition of wire 25, will enable NAND gate 37 and ripple counter 35 through NAND gate 38. NAND gate 36 is so configured as to decode a binary count of 504 (because the binary outputs necessary to decode an exact 500 were not available on the particular integrated circuit used for ripple counter 35), which results in this device performing its roundoff function four thousandths of a cent beyond the exact one half cent point.

It will thus be seen that the output appearing on conductor 22 from divide-by-thousand counter 21 will be a number of pulses which, when summed, will be the binary equivalent of the cost of each unit quantity (1/100 gallon) of fluid dispensed. Similarly, each pulse signal generated by pulse source 18 will represent 1/100 gallon of fluid dispensed.

Figure 9:
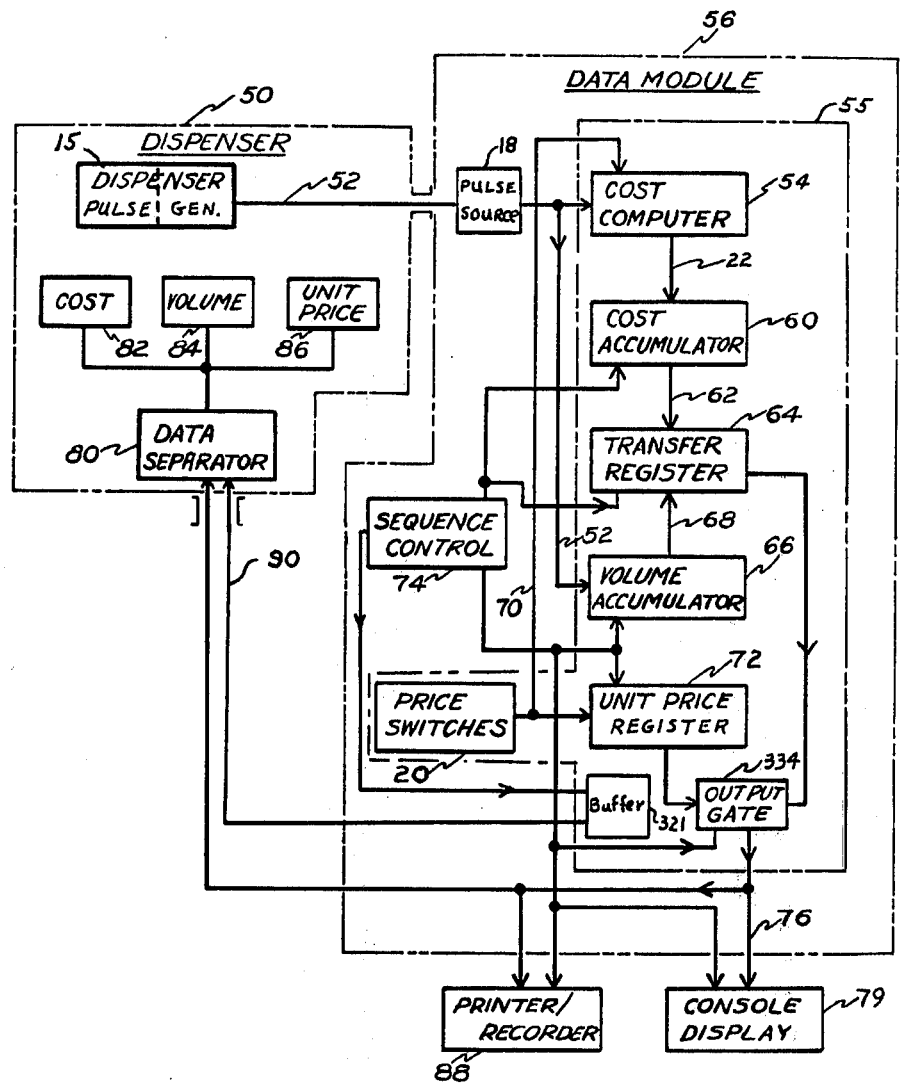
FIG. 9 is a simplified block diagram of the complete data system of the present invention.

Referring now to FIG. 9, there is shown a simplified block diagram of the electronic display of the present invention. The fluid dispenser indicated by dashed box 50 includes the pulse generator 15 connected by conductor 52 to pulse source 18 and cost computer 54, the cost computer comprising the circuitry above-described. The cost computer is situated within a data module indicated by dashed box 56 which may be situated within a service center, gas station or the like with which dispenser 50 is associated.

Cost pulses generated by the cost computer 54 are passed via a conductor 22 to cost register or accumulator 60. As will be explained in more detail below, cost accumulator 60 receives and totals the pulses received via conductor 22 to generate a binary coded decimal number equivalent to the accumulated cost of fluid dispensed. Cost accumulator 60 further includes circuitry for transferring the binary coded accumulated cost signal via a plurality of conductors 62 to a proximately located transfer register 64.

Simultaneously, the volume pulses transmitted via conductor 52 are passed into a volume accumulator 66. Volume accumulator 66 again includes a register or accumulator for totaling the volume pulses to generate a binary coded decimal signal equivalent to the accumulated volume of fluid dispensed and circuitry for transferring the binary coded signal via a plurality of conductors 68 to transfer register 64. The unit price switches 20 simultaneously apply a static signal to the cost computer via conductors 70 as explained above and to a unit price register 72.

Both cost accumulator 60 and volume accumulator 66 are serial input parallel output registers and unit price register 72 is a parallel input serial output register. Transfer register 64 is a parallel input serial output register. The outputed data is in serial binary coded decimal format. Control of the cost accumulator, transfer register, volume accumulator, and unit price register is by means of a sequence control circuit 74, which, as will be explained in detail below, controls the transfer of the binary coded data between and out of the registers at predetermined times and in a predetermined sequence. The data transferred into the transfer register 64 and contained in the unit price register 72 is effectively interlaced and transmitted serially and alternately as a data "burst" of short time duration via a single conductor 76 through an output gate 334, gate 334 again being under the control of control circuit 74. The serial data can be transmitted simultaneously to a console display 79 which is synchronized again by sequence control 74, to a dispenser display including a data separator 80 and cost, volume, and unit price display circuits 82, 84 and 86, respectively. This same serial data can be inputed into a printer and or recorder 88 to effect automatic printing of receipts, permanent records and the like. Synchronizing signals are passed from sequence control 74 to the dispenser display circuitry typically through a buffer circuit 321 which may be included as part of circuit assembly 55, again over a single conductor 90. It will thus be observed that all of the data and synchronizing signals that must be passed between the data module 56 and dispenser 50 is transmitted via only three conductors. Additionally, a power supply conductor and a reference terminal such as ground may be required for a total of five conductors that must extend between the remotely located units for numerical data transmission. These conductors can, because of their limited number, be passed through the standard three quarter inch conduit normally installed in most existing fluid dispensing facilities without the need for installing new underground conduits or otherwise damaging or modifying the physical portions thereof.

Referring now to FIG. 3, the sequence control circuit 74 is shown in detail. The circuit comprises a gated oscillator 90 having a control terminal 92 and output terminals 94, 96. The circuit further includes a NOR gate 98 and a pair of NAND gates 100, 102 connected to function as inverters, gates 98, 100 and 102 being serially connected as shown. A feedback network including resistors 104, 106 and a capacitor 108 is connected between input terminal 110 of NOR gate 98 and output terminals 94, 96 as shown. Thus connected, gated oscillator 90 will operate to generate a pair of complementary, approximately symetrical square wave signals at its output terminals 94, 96 whenever a logic 0 signal is applied to the input terminal 112 of NOR gate 98. When a logic 1 signal is applied to input terminal 112, the gated oscillator 98 will cease to operate.

Figure 7:
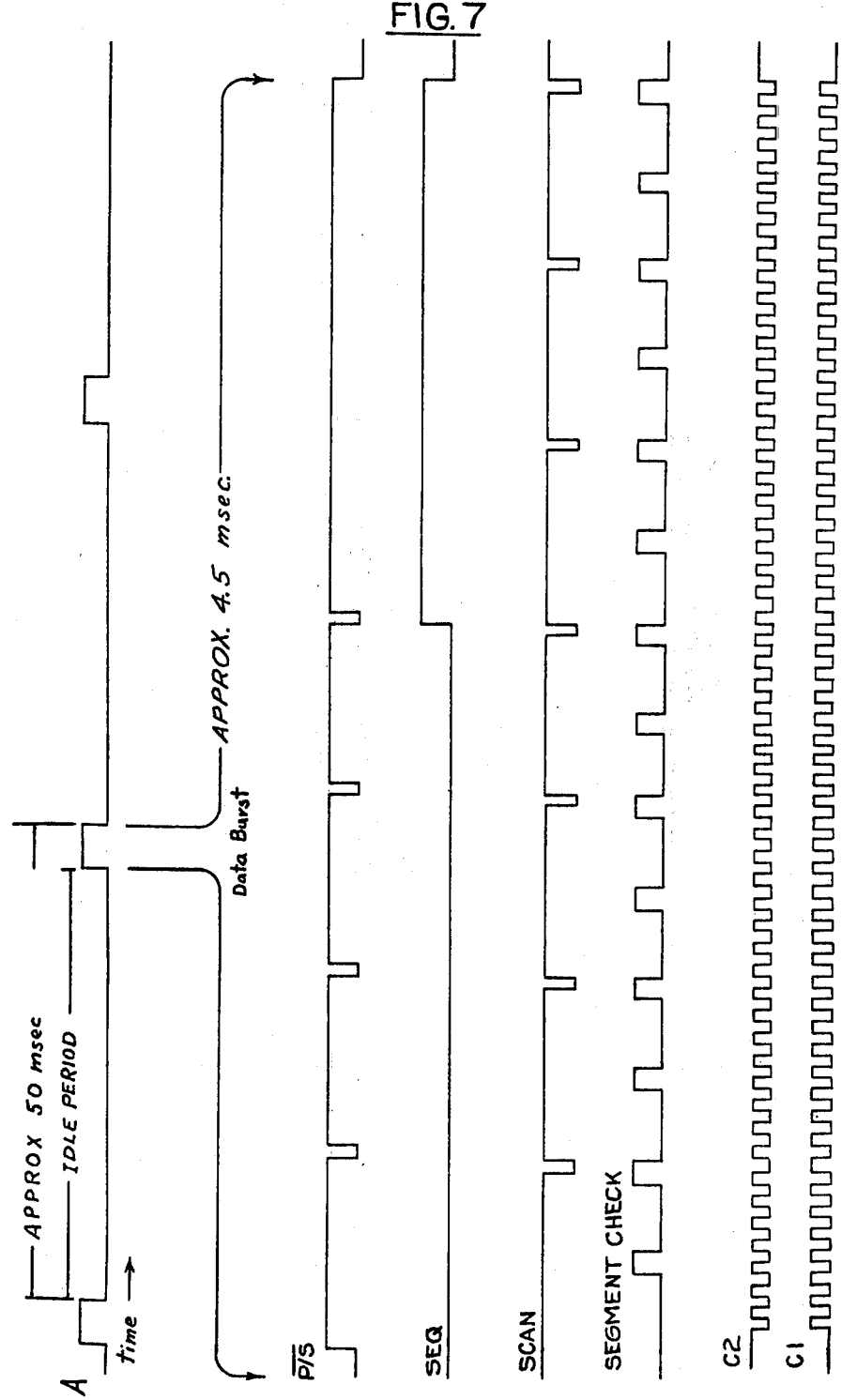
FIGS. 7 and 8 are diagrams showing time relationships of selected signals occurring in the circuit useful in explaining the operation thereof.

Inverters 114, 116 are connected to output terminals 94, 96, inverters 114, 116 functioning as buffers. The output signals appearing at terminals 118, 121 will, correspondingly, be a pair of symmetrical square wave signals 180° out of phase with each other. These two signals are identified respectively as C-1 and C-2 and are shown in the chart of FIG. 7. It will further be observed that the C-1 and C-2 signals appear at terminals 120 and 94, respectively, by reason of these terminals being connected to the opposite side of buffer inverters 116, 114, respectively.

The C-1 signal is applied to the clock input terminal 122 of a binary ripple counter 124. Counter 124 may, for example, be a seven bit binary counter such as a Motorola MC14024. Counter 124 is connected to ground reference 126 via ground terminal 128 and includes a plurality of output terminals 130, 132, 134, 136, 138, and 140 and will generate a binary coded signal equivalent to the accumulated number of C-1 pulses received at clock terminal 122 following an appropriate reset signal at reset terminal 206 thereof as will be explained in more detail below; terminals 130, 132, 134, 136, 138 and 140 representing the $2^0$ through $2^6$ bits of the binary coded number.

A three input NAND gate 142 has its input terminals 144, 146 and 148 connected to terminals 130, 132 and 134 of counter 124. Correspondingly, gate 142 will generate a logic 0 signal at its output terminal 150 when the signals on terminals 130, 132 and 134 are all at logic 1. This event will occur every eighth C-1 pulse. The signal at terminal 150 will return to logic 1 on each succeeding pulse following the aforementioned eighth pulse. The signal appearing at terminal 150 is applied to the "D" input 152 of a conventional "D" type flip-flop 154. The clock input terminal 156 of flip-flop 154 is connected to terminal 120 to receive the C-1 signals. The "Q" output terminal 158 of flip-flop 154 and the C-1 terminal 120 of oscillator 90 are coupled to the "set" terminal 160 of flip-flop 154 through a NOR gate 162.

In operation, the signal at terminal 158 is initially logic 1. The C-1 pulses are applied to input terminal 156. The signal being applied to terminal 152 is at logic 1 since not all of the inputs to gate 142 are at logic 1. Correspondingly, flip-flop 154 will continue to generate a logic 1 signal at its output terminal 158 until all of the inputs to gate 142 are at logic 1. When this occurs, a logic 0 signal is applied to terminal 152 of flip-flop 154 whereby, flip-flop 154 will generate a logic 0 signal at its output terminal 158. This transition occurs in response to the rising edge of each eighth C-1 pulse whose logic 1 state immediately following maintains the output from NOR gate 162 at logic 0. However, when the C-1 pulse terminates (C-1 goes to 0) the inputs to NOR gate 162 will both be at logic 0 and a very brief logic 1 signal will be applied to "set" terminal 160 of flip-flop 154. This immediately sets flip-flop 154 such that it will generate a logic 1 signal at its output 158. This cycle continues repetitively each eighth C-1 pulse thereby generating an output wave form identified as the "Scan" signal in FIG. 7, this signal appearing at output terminal 166.

The output from NAND gate 142 is logically combined with the signal from output terminal 140 of counter 124 via a NOR gate 170. It will be observed that terminal 140 goes from logic 0 to logic 1 on the thirty-second C-1 pulse. Correspondingly, during the occurrence of the first thirty-two C-1 pulses the output from NOR gate 170 is normally at logic 0 but shifts to a logic 1 each eighth C-1 pulse (at which time the output of NAND gate 142 goes to logic 0). The output from NOR gate 170 is applied to the "D" input 172 of another "D" type flip-flop 174. It should be observed that flip-flop 174 operates in response to a logic 1 "set" signal at its set input 176.

Simultaneously, C-1 pulses are applied to clock input 178 of flip-flop 174. Output terminals 136, 138 and 140 of counter 124 are coupled to a NAND gate 180 and the output of NAND gate 180 is coupled through another NAND gate 182, the latter being connected to function as an inverter and the output thereof is applied to the set input 176 of flip-flop 174. In operation, when the signals at output terminals 136, 138 and 140 of counter 124 are all at logic 1 the output of NAND gate 180 will be logic 0. This logic 0 signal is inverted by NAND gate 182 and applied as a set signal to the "set" input 176 of flip-flop 174. Since terminals 136, 138 and 140 represent $2^3 + 2^4 + 2^5 = 56$, this occurs on completion of the fifty-sixth pulse. Accordingly, the output appearing at the "Q" output 186 of flip-flop 174 will be at logic 0 for seven C-1 pulses at which time it will shift to a logic 1 for one C-1 pulse and return to logic 0. This continues until the thirty-second C-1 pulse. At this time, NOR gate 170 output is locked at logic 0 by reason of the output at terminal 140 being continuously at logic 1. This in effect locks the output at terminal 186 at logic 0. The output from terminal 186 is combined with C-1 pulses through a NAND gate 190 which inverts the output of flip-flop 174 and truncates the first half of each positive pulse produced thereby. This output is identified as the not P/S ($\overline{P/S}$) signal and is shown in the chart of FIG. 7.

Other signals derived from the circuit of FIG. 3 are the "Segment Check" signal shown in FIG. 7. This signal is derived from a NAND gate 192 having its inputs connected to output terminals 130, 132 of counter 124 and inverting the output from NAND gate 192 via a NOR gate 194. The output from terminal 140 of counter 124 is also utilized and is identified as the "Sequence" signal also shown in FIG. 7.

It has been assumed initially that a logic 0 signal was applied to input terminal 92 of the oscillator 90 thereby causing the same to operate. Control of the oscillator is effected by a gating circuit 200 (which functions as a one-shot multivibrator) which is connected to terminal 92, ground 126 and the output of NAND gate 180. When the circuit is first energized, there will be no charge on capacitor 202 whereby a logic 0 signal will be applied via conductor 204 to "reset" terminal 206 of counter 124. It is further assumed that the counter 124 outputs appearing at terminals 136, 138 and 140 are at logic 0. This generates a logic 1 signal at the output of NAND gate 180 which is applied to one input terminal 208 of NAND gate 210 in the gating circuit 200.

Both inputs 212, 214 of a second NAND gate 216 of the gating circuit 200 are connected through a resistor 220 to ground 126. As a starting point, it will be assumed that terminals 212, 214 are both at logic 0 whereby NAND gate 216 generates a logic 1 signal at its output terminal 222. It will thus be seen that both inputs to NAND gate 210 are at logic 1 whereby it generates a logic 0 signal at its output terminal 224. This, as explained above, applies a logic 0 signal to input terminal 92 of oscillator 90 rendering the latter operative. This causes C-1 pulses to be applied to the clock input terminal 122 of counter 124. This condition continues for 56 C-1 pulses.

Upon completion of the 56 C-1 pulse, the outputs at terminals 136, 138, and 140 of counter 124 all assume a logic 1 state whereby the output of NAND gate 180 shifts to logic 0. This causes the output of NAND gate 210 to shift from a logic 0 output to a logic 1 output, applying a charging current to capacitor 202 through resistor 220. This initially generates logic 1 signals at input terminals 212, 214 of NAND gate 216. Simultaneously, the shift of the output of NAND gate 210 to logic 1 applies a reset signal to terminal 206 of counter 124 resetting the output thereof 0. The output of NAND gate 216 is now at logic 0 due to the charging current flowing through capacitor 202. The input on terminal 208 of NAND gate 210 resumes a logic 1 state because of the reset signal applied to counter 124. Correspondingly, the output of NAND gate 210 remains at logic 1 and oscillator 90 remains in an idle state. As the charge builds on capacitor 202, the input voltage applied to terminals 212, 214 of NAND gate 216 decreases until this signal again reaches a logic 0 threshold. This causes the output of NAND gate 216 to shift from logic 0 to logic 1 whereby both inputs to NAND gate 210 are again logic 1 and its output shifts to logic 0. This causes the oscillator 90 to again resume operation and the cycle repeats. In a working embodiment of the invention, the period required for capacitor 202 to charge sufficiently to cause the shift NAND gate 216 output from a logic 0 to a logic 1 output is about 45 milliseconds and the frequency of the C-1 pulses is such that 56 pulses occupy about 4.5 milliseconds for a total repetition cycle of about 50 milliseconds. This timing cycle is illustrated in FIG. 7.

Figure 4:
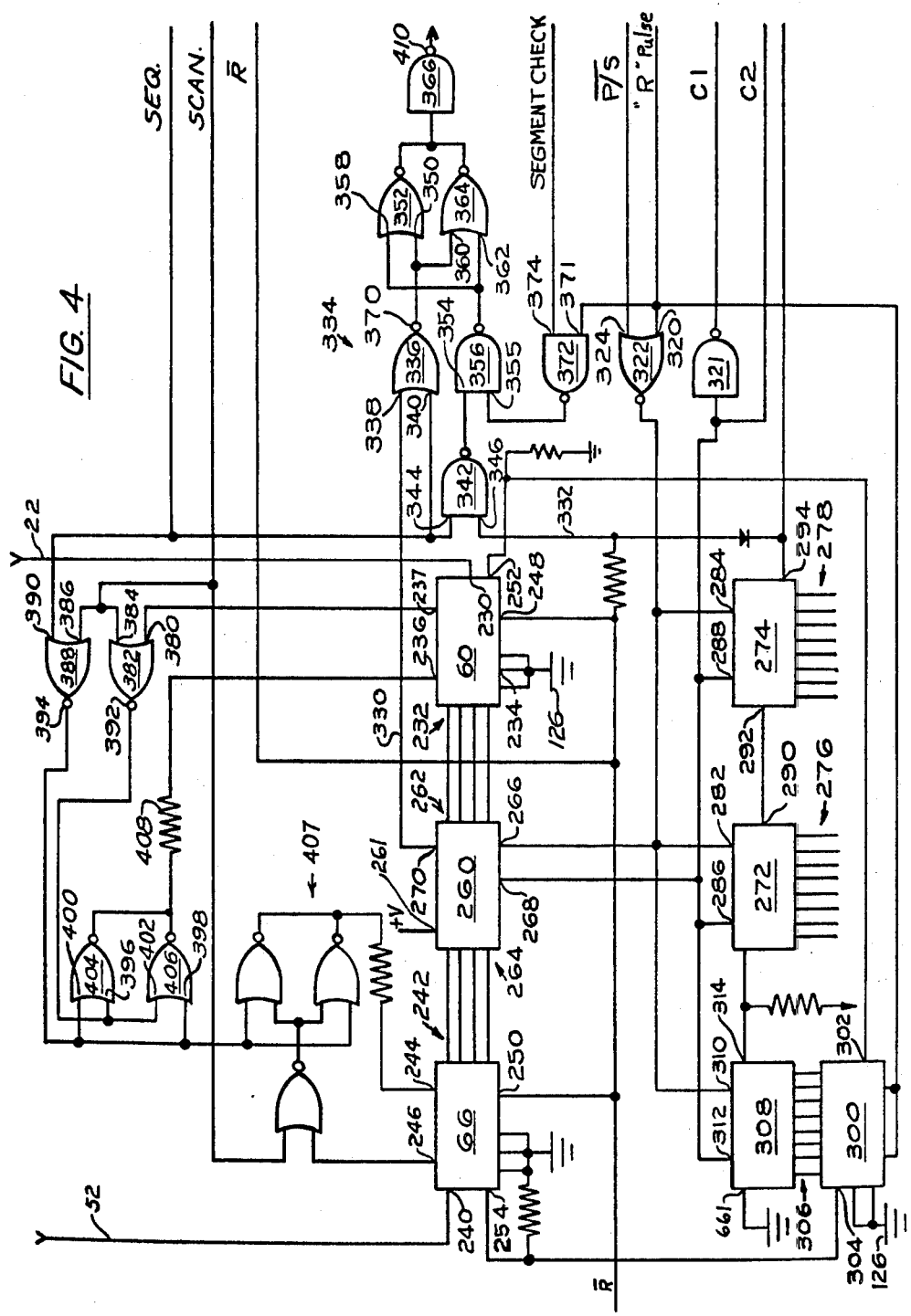
FIG. 4 is an electrical schematic of the serial data transmitting portions of the circuit of the present invention.

Referring now to FIG. 4, there is illustrated that portion of the circuitry of the present invention for accumulating, serializing, and transferring data from the data module to the dispenser or other display or data processing units. The circuit comprises a first serial input-parallel output accumulator 60 which is in fact the cost accumulator 60 of FIG. 9. Accumulator 60 includes a serial input terminal 230 which is connected to conductor 22 to receive the incremental cost pulses from the cost computer 54 of FIG. 9. This accumulator may be a single integrated circuit such as an MK5007 manufactured by MOSTEK, 1215 W. Crosby Rd., Carrollton, Tex. Internally accumulator 60 includes circuitry for accumulating or totalling the cost pulses received at terminal 230 and has a capacity of four digits or a count of 9999. Input to the counter is continuous and the accumulated value therein is outputed sequentially one digit at a time in binary coded decimal format at output terminals 232. The output from counter 60 is rendered continuous by connecting the "transfer" input terminal 234 thereof continuously to ground 126, thereby bypassing an internal latching function of counter 60 which is not needed. Shifting of the output at terminals 232 from most significant digit (MSD) data through least significant digit (LSD) data is effected by applying pulses to a scan input terminal 236. When the counter 60 is set to output MSD data at terminals 232, a logic 1 signal appears at MSD terminal 237 thereof. When the counter 60 is not set to output MSD data, the output at terminal 237 is at logic 0.

Similarly, volume accumulator 66 is a counter such as a MOSTEK MK5007 having its input terminal 240 connected via conductor 52 to the dispenser pulse source 18 (through flip-flop 17) to receive the volume pulses therefrom. As with the accumulator 60, accumulator 66 totals the volume pulses received, accumulator 66 having a capacity of 9999 and also being internally configured to output the accumulated value sequentially one digit at a time via output terminals 242 in BCD code. The output at terminals 242 transfers or shifts from a BCD value representing one digit of the accumulated value in register 66 to a BCD value representing the next digit of the accumulated value therein in response to an indexing or scan signal at its terminal 244. When the accumulator 66 has been indexed to output data representing the most significant digit of the data therein, a logic 1 signal appears at MSD output terminal 246 thereof. Both accumulators 60 and 66 further include conventional reset input terminals 248, 250, respectively, and include output terminals 252, 254 for outputing data in excess of the capacity thereof.

A parallel input register 260 having a capacity of eight binary bits has its parallel input terminals 262, 264 connected to output terminals 232, 242 of registers 60, 66, respectively. This register may be a commercially available unit such as a Motorola MC14021. In operation, register 260 will receive parallel input data via terminals 262, 264 when the signal at its P/S input terminals 266 is at logic 1. When the signal at terminal 266 shifts to a logic 0, operation of the register is internally altered whereby it will output the data in its internal registers serially one bit at a time in response to clock pulse signals at terminal 268 thereof. As connected in the present circuit, four bits of the data contained within register 260 will represent one decimal digit of the data received from cost accumulator 60 while the other four bits of data within register 260 at the same time will represent four bits or one decimal digit of data from the volume accumulator 66.

By connecting terminals 232, 242 to proper ones of terminals 262, 264, respectively, the data shifted serially out of register 260 will correspond to first one digit of data from the cost accumulator 60 followed by one digit of data from volume accumulator 66. This data is shifted out serially via output terminal 270. As will be explained in more detail below, one data digit is transferred from each of registers or accumulators 60, 66 into register 260, register 260 is conditioned to serially output the data and the data is incremented or shifted therefrom in response to clock pulses at terminal 268. When eight bits of data have been shifted (i.e., the two data digits) registers 60 and 66 are incremented to present the next two most significant data digits at their output terminals 232, 242. Register 260 is again conditioned to receive parallel inputs via terminal 262, 264 to thereby receive the next two data digits, returned to its serial output mode and the data again serially shifted therefrom via output terminal 270. This sequence continues until all of the data in registers 60 and 66 has been serially shifted or outputed from register 260.

Registers 272, 274 are provided for serializing the unit cost or unit price signals generated by thumbwheel switches 20 (FIG. 1 only). Registers 272, 274 may be identical to register 260, each being provided with a plurality of input terminals as at 276, 278 which are connected to the output terminals of thumbwheel switches A, B and C to receive the binary coded decimal equivalent of the unit price. As with register 260, registers 272, 274 are conditioned to receive parallel input data at their terminals 276, 278 in response to a P/S signal at their respective control terminals 282, 284. When the control signal at terminals 282, 284 shifts, the registers 272, 274 are conditioned to output data serially in response to clock pulses applied to their terminals 286, 288. It will be observed that register 272 will serially output its data at terminal 290. This data is shifted serially into register 274 which has a serial input terminal 292. The data from register 272 is essentially shifted through register 274 whereby it is serially outputed from the register 274 in sequence after the data within register 274 is outputed by output terminal 294.

Accumulators 60 and 66 further include "count extend" output terminals 252, 254. When the data inputed to registers 60, 66 exceeds the capacity thereof, additional data is automatically outputed by the terminals 252, 254. A carry register 300, which is essentially a dual "up" counter, has two serial input terminals 302, 304 connected to output terminals 252, 254 of registers 60, 66 to receive overflow data therefrom. Register 300 in effect provides one additional digit capacity for each of registers 60 and 66. The data therein is synchronously outputed via a plurality of output terminals 306 into another parallel input, serial output register 308 which is essentially identical to registers 272, 274. Register 308 again has a P/S control terminal 310 and a clock pulse input terminal 312 and outputs serial data via output terminal 314. Register 308 is connected to input serial data into register 272.

It will thus be observed that in response to the proper P/S control signal, registers 272, 274, and 308 will output their data serially and synchronously via output terminal 294 of register 274. It will further be observed that it will require 24 clock pulses to shift all 24 binary bits of data within registers 272, 274 and 308 through output terminal 294. Seven clock pulses are required to shift all of the data within register 260 serially outwardly via terminal 270 (the first bit of data appears automatically at output terminal 270 when it is shifted to its parallel input mode). This sequence must be repeated four times to serialize the four data digits in registers 60 and 66. An additional clock pulse period is required to load parallel data from registers 60, 66 into serializing register 260 thereby requiring eight clock pulses for each digit pair and a total of 32 clock pulses to serialize all of the volume and cost data.

Combining the circuits of FIGS. 3 and 4, the operation of the serializing circuitry is as follows: initially it will be assumed that the timing circuit comprising resistor 220 and capacitor 202 has decayed causing operation of circuit 200 such that it shifts from a logic 1 to a logic 0 output at its terminal 92. This removes a reset signal previously applied to terminal 206 of counter 124. It will also be assumed that volume and cost data has been accumulated by registers 60, 66 and unit price data is being inputed to registers 272, 274 from the price switches A, B and C. It will also be assumed that accumulators 60 and 66 are properly conditioned to output BCD data at their terminals 232, 242, respectively, representative of the most significant digit of data therein. (As will be explained below, this condition is automatically provided for by the circuitry.) Concurrently with the removal of the reset signal, oscillator 90 begins to function generating the C-1 and C-2 pulses. A logic 0 signal is provided from a dispenser reset circuit (not shown) which is applied to one input 320 of a NOR gate 322. The other input 324 of NOR gate 322 is connected to the P/S output of the control circuit 74. The output from NOR gate 322 is correspondingly the required P/S signal. This signal is initially at logic 1 whereby registers 260, 272, 274, and 308 are all conditioned to receive parallel data. Correspondingly, the first and most significant digit of the accumulated cost and volume data are loaded from registers 60 and 66 into register 260 and the BCD data from thumbwheel switches A, B and C are loaded into registers 272, 274 (and additional data transferred from register 300, to register 308 if these are used).

Next, the P/S signal shifts from logic 1 to logic 0 thereby conditioning registers 260, 272 and 274 to serially output data via their output terminals 270, 290, and 294. This data is transmitted via conductors 330 and 332 to a gating circuit 334.

Circuit 334 comprises a NOR gate 336 having one input thereof connected to conductor 330 to receive the serialized data from register 260 and its other input terminal 340 connected to receive the "Sequence" signal from the control circuit 74. Circuit 334 further includes a NAND gate 342 having an input terminal 344 connected to receive the "Sequence" signal and an input terminal 346 connected to output terminal 294 of register 274 to receive the serial data therefrom. The output of NOR gate 336 is applied to one input terminal 350 of another NOR gate 352. The output from NAND gate 342 is applied to one input 354 of a second NAND gate 356 and the output of NAND gate 356 is applied to the remaining input terminal 358 of NOR gate 352. The outputs of NOR gate 336 and NAND gate 356 are also applied to individual ones of the inputs 360, 362 of NOR gate 364 and the outputs of NOR gates 352 and 364 are applied in parallel to the input of a buffering inverter 366.

Initially, the "Sequence" signal (FIG. 7) is at logic 0. Under these conditions, the output of NOR gate 336 will be a logic 0 when the input to terminal 338 thereof is at logic 1 and will be at logic 1 when the input to terminal 338 is at logic 0.

Simultaneously, under these conditions the output of NAND gate 342 will always be at logic 1 since one input thereof is locked at logic 0. Simultaneously with the logic 0 state of the "Sequence" signal, C-2 pulses are applied to the clock input terminal 268 of register 260 and the "P/S" signal is at logic 0 whereby register 260 is conditioned to serially output its data via terminal 270. These conditions cause the output of NOR gate 336 to be the complement of the data serially outputed from register 260. Since the data issuing from registers 60, 66 is complementary binary coded decimal ($\overline{BCD}$) it remains in complementary form through the serial conversion of register 260, the additional inversion of NOR gate 336 causing non-inverted data to appear at the output terminal 370 thereof.

Simultaneously, the input to terminal 371 of NAND gate 372 is at logic 0, this signal being received from the reset circuitry (not shown) of the dispenser. This locks the output from NAND gate 372 at logic 1 whereby both inputs 354 and 355 of NAND gate 356 are at logic 1 and the output of NAND gate 356 is at logic 0.

Under these conditions, the inputs to parallel NOR gate 352, 364 will be a logic 0 signal at terminal 358, 362, respectively and the complement of the serialized complementary data of register 260 at terminals 350, 360, respectively. This produces an output from NOR gate 352 that is the serialized data as shifted out of register 260. This data passes through inverting buffer 366.

This operation continues for eight C-2 pulses whereby the first two digits of data within register 260 are serially outputed therefrom. This data represents the most significant digits of the data within registers 60, 66, this data being the accumulated cost and volume data. It should be observed that the serialized data is outputed in response to a shift from logic 0 to a logic 1 of the C-2 pulse. The first binary bit appears instantly at output 270 when the register 260 is shifted into its parallel loading mode and remains until the first positive-going C-2 pulse transition following a return to serial mode. Correspondingly all eight bits of the data within register 260 will have been outputed by the end of the seventh complete C-2 clock pulse cycle. At this time, the "Scan" signal (FIG. 7) shifts from logic 1 to logic 0 for the duration of the 8th clock pulse.

Since it has been assumed that accumulators 60, 66 are each initially conditioned to output their most significant data digit, logic 1 signals are present at output terminals 237, 246. The logic 1 signal from terminal 237 is applied to one input 380 of a NOR gate 382. The other input 384 and one input 386 of another NOR gate 382 are connected in common to receive the "Scan" signal. The remaining input 390 of NOR gate 388 is connected to receive the "Sequence" signal. The outputs 392, 394 of NOR gates 382, 388 are connected to respective ones of the inputs 396, 398 and 400, 402 of a parallel connected pair of NOR gates 404, 406. The outputs of gates 404, 406 are connected in common through a resistor 408 to the scan input terminal 236 of accumulator 60.

Initially, the "Sequence" signal is at logic 0 (FIG. 7) and the "Scan" signal is at logic 1. On the eighth C-1 pulse, the sequence signal remains at logic 0 and the scan signal makes a transition from logic 1 to logic 0 and back to logic 1. This causes the output of NOR gate 388 to shift to logic 1 and the outputs of NOR gates 404, 406 to be at logic 0, therefore applying a negative-going "Scan" pulse to input terminal 234 of accumulator 60. It will be observed that this pulse occurs concurrently with the "Scan" signal. This indexes the accumulator 60 to output its next most significant data digit. Next in this operating sequence, the "P/S" signal shifts from logic 0 to logic 1 thereby causing the data within accumulator 60 to be inputed to register 260. The data in register 260 is now again serially outputed as described above. A circuit similar to the circuit including NOR gates 382, 404 and 406 is coupled between the "Sequence", "Scan" and MSD output terminals 246 of accumulator 66 to thereby index accumulator 66 to sequentially output each of the data digits therein to the register 260.

This sequence continues until all four data digits in each of accumulators 60 and 66 have been inputed to register 260 and serially transferred therefrom via circuit 334. This requires a total of 32 C-1 pulses. Upon the occurrence of the trailing edge of the thirty-second C-1 pulse, the sequence signal shifts from logic 0 to logic 1. This in turn applies a logic 1 signal to the input terminal 390 of NOR gate 388. This locks the output of the NOR gate 388 at logic 0. If the signal at output terminal 237 of accumulator 60 has returned to a logic 1 indicating that the accumulator is conditioned to output its most significant digit, a logic 1 is applied to terminal 380 of NOR gate 382. Under these conditions the output of NOR gate 382 will remain at logic 0.

This effectively holds the input to "Scan" input terminal 236 of accumulator 60 at logic 1 whereby no further scan indexing signals are applied thereto. However, if the output of the most significant digit output terminal 237 is at logic 0 indicating that accumulator 60 is not conditioned to output its most significant digit, a logic 0 is applied to input terminal 380 of NOR gate 382. The scan signal will be transmitted through the NOR gates 382, 404 and 406 to index accumulator 60. This sequence will continue until the signal at output terminal 237 shifts to a logic 1 indicating proper conditioning of the accumulator 60. At this point indexing of the accumulator will cease until the next data output sequence. A similar circuit 407 is coupled to accumulator 66, thus it will be seen that accumulator 60 and accumulator 66 are always resynchronized during each sequence such that they output their most significant data digit at the commencement of each data serializing sequence.

Next in the operating sequence, the sequence signal shifts from its logic 0 to logic 1 state. This transfers the inputs of NAND gate 342 and NOR gate 336 such that the data within registers 272, 274 (and register 308 if it is in use) are now serially transferred through the circuit 334 instead of data from register 260.

From the above description it will be seen that the circuit of FIG. 4 automatically and sequentially accumulates the volume and accumulated cost data, and the unit cost data, transfers this data in parallel form into registers 260, 272 and 274 (and 308 if used). This data is serialized and sequentially transferred via a single output conductor 410. The registers are always automatically incremented or conditioned to output the most significant data digit first and the entire serializing and transfer function occurs in response to a total of 56 C-1 pulses. At the end of the fifty-sixth C-1 pulse, the serializing circuit is automatically idled. The circuit remains in this idle condition until the timing network of circuit 200 times out to reinitiate the data transfer function. In a working embodiment of the invention, the data transfer occurs during a time period of 4.5 milliseconds, there being about a 45 millisecond idle period between data transfer sequences.

The serialized data is transmitted bit by bit via conductor 410, the latter being connected to the dispenser display circuits, a console display, and the like. Simultaneously, the C-1 pulses, a suitable means to supply voltage, and a reference conductor may be connected between the computing circuitry, serializing and data transferring circuitry and the dispenser, console and the like display circuits. The total number of conductors that must be connected between the different modules is thus seen to be five including the single conductor that must be provided to pass the pulse signals from the dispenser pulse generator 15 to the pulse source 18.

Figure 5:
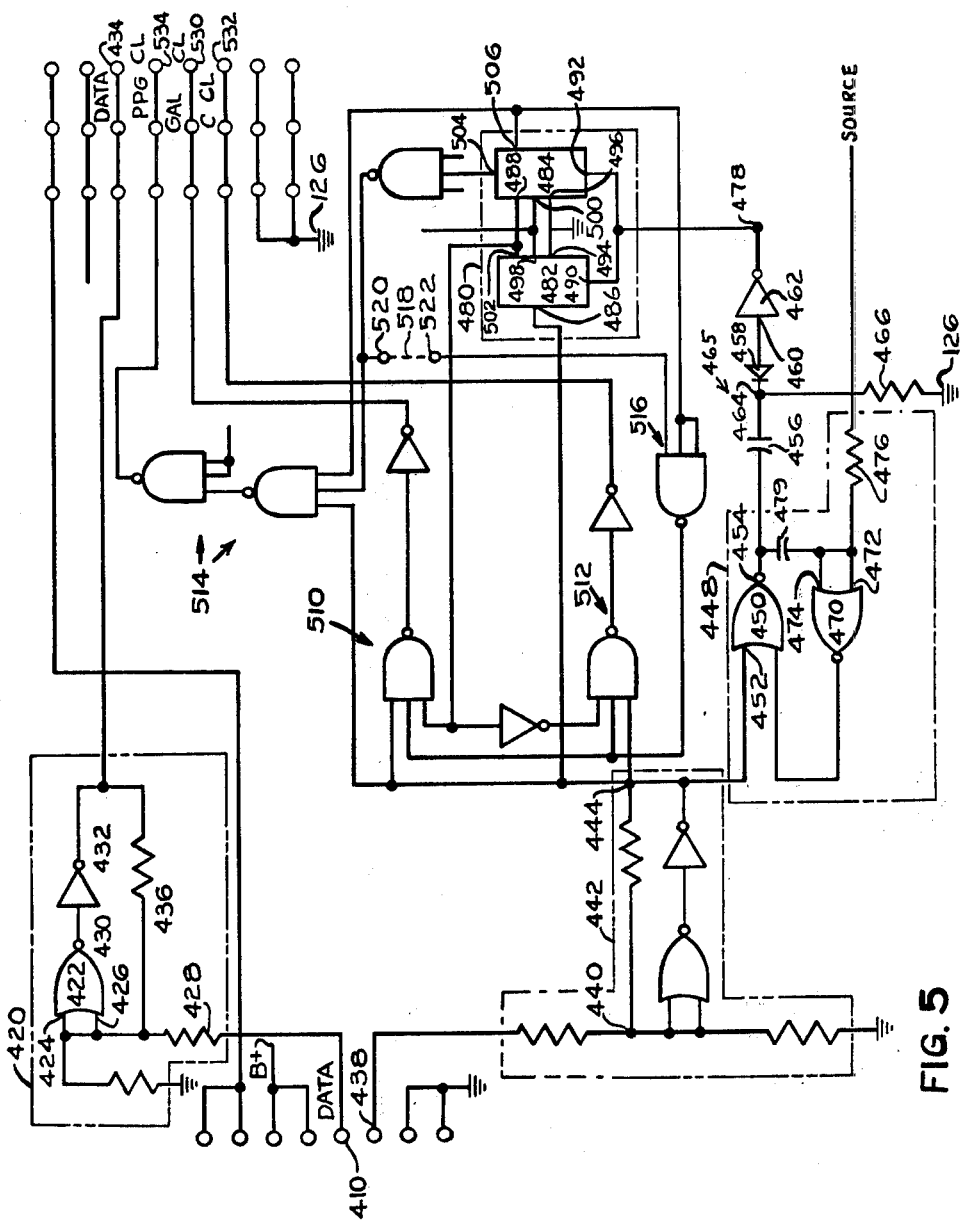
FIG. 5 is an electrical schematic of a portion of the display circuitry of the present invention.

Referring now to FIG. 5, there is illustrated an electrical schematic of a portion of the display circuitry of the present invention. The circuit of FIG. 5 functions to generate a plurality of groups of pulse signals, these signals being derived from the C-1 pulses and being shown in FIG. 8, and further functions to buffer the serialized data signal received via conductor 410, the circuit of FIG. 5 essentially "cleaning up" the data signal and reducing the voltage levels thereof from 12 to 5 volts compatible with the display circuitry.

This last-mentioned function is performed by circuit 420 which comprises a NOR gate 422 having its input terminals 424, 426 connected in common to conductor 410 via a resistor 428. The output of NOR gate 422 is applied to the input terminal 430 of an inverter 432. The output from inverter 432 is passed to subsequent sections of the display circuitry via an output terminal 434 and a portion thereof is passed backwardly through the circuit 420 via a feedback loop comprising resistor 436. This signal appearing at output terminal 434 will be the serialized data signal outputed from NAND gate 366 (FIG. 4) but reduced in voltage.

Simultaneously with the level conversion of the data signal, C-1 pulses are received on input terminal 438 of the circuit of FIG. 5. The C-1 pulses are applied to the input terminal 440 of a second signal conditioning circuit 442 which is substantially identical to circuit 420 in configuration and operation. Circuit 442 again buffers the C-1 signals and reduces the voltage level thereof.

The C-1 pulses are outputed from circuit 442 via output terminal 444.

The C-1 output pulses appearing at terminal 444 are applied to a one shot timing circuit 448. Timer circuit 448 comprises a NOR gate 450 having one input 452 thereof connected to output terminal 444. A second NOR gate 470 has its input terminals 472, 474 coupled to a fixed voltage source through a resistor 476. A capacitor 479 is coupled between output terminal 454 of NOR gate 450 and input terminals 472, 474 of NOR gate 470. The output 454 of NOR gate 450 is coupled via a differentiating circuit 465 comprising a capacitor 456 and resistor 466 through a diode 458 to the input 460 of an inverter 462. In operation, the one-shot timer circuit 448 shifts its output (terminal 454) from a logic 1 to a logic 0 in response to the leading edge of the first C-1 pulse received at input terminal 438. Successive C-1 pulses have no effect on one-shot timing circuit 448 since it has now been "triggered" and as explained below remains so for a period longer than the time period required for 56 C-1 pulses to occur. The output of circuit 448 is applied to the input of differentiating circuit 465 to generate a short duration negative pulse at terminal 464. This pulse is passed by diode 458 to inverter 462. Inverter 462 inverts and "squares" this last-mentioned pulse, the "squared" pulse being utilized as a reset signal as explained below. One-shot timing circuit automatically resets or returns to an idle state after a delay period determined by resistor 476 and capacitor 479 (about 20 milliseconds in a working embodiment of the invention). The resulting shift of the output of circuit 448 from logic 0 to logic 1 causes a positive short duration pulse to be generated at terminal 464, but this pulse is blocked by diode 458.

Simultaneously with application of the C-1 pulses to circuit 448, the C-1 pulses are applied to a counter circuit 480 which comprises a pair of three bit ripple counters 482, 484 cascade connected as shown in FIG. 5. Terminals 486, 488 are the count input terminals and terminals 490, 492 are the reset input terminals, these being connected to terminal 478 of timer circuit 448 (ground or reference terminals 494, 496 and supply terminals 498, 500 are conventionally connected). Terminal 502 of counter 482 is the "Q3" output terminal thereof and terminals 504, 506 of counter 484 are the "Q2" and "Q3" output terminals thereof. As configured, the signal at terminal 502 will shift between logic 0 and logic 1 response to the trailing edge of each fourth C-1 pulse. The signal at output terminal 504 of counter 484 will shift between logic 0 and logic 1 in response to every other negative-going shift of the signal at terminal 502 or after each 16 C-1 pulses.

Figure 8:
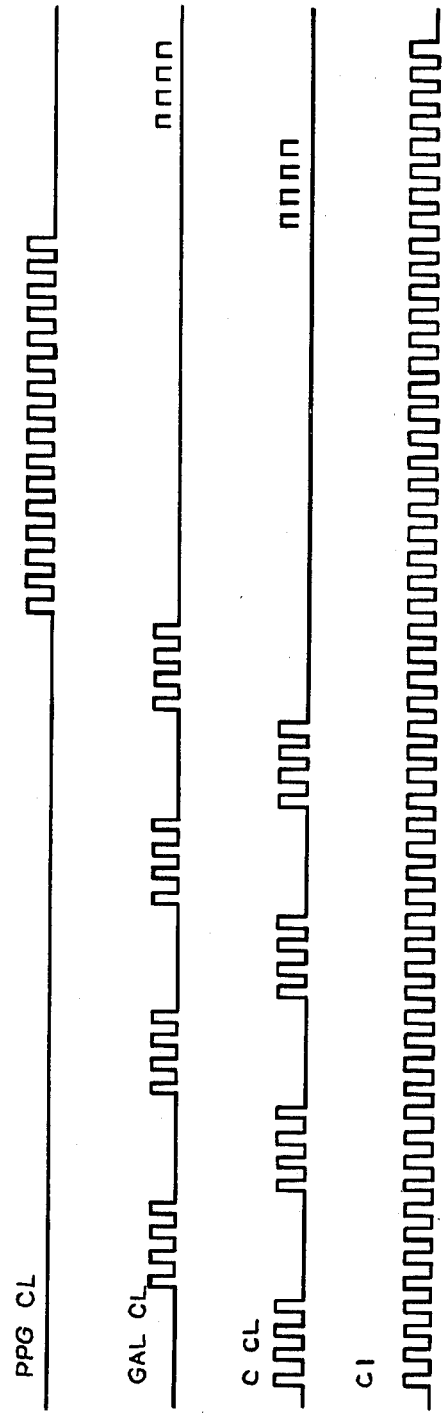

A group of three gating circuits 510, 512, and 514 have their input terminals coupled to the terminals 502, 504, and 506 of counting circuit 480 and to terminal 444 of circuit 442 to receive the C-1 pulses such that the outputs from these circuits will be a group of alternately occurring pulse trains identified as the gallon clock, abbreviated gal. cl.; price per gallon clock, abbreviated ppg cl; and cost clock abbreviated c cl; these signals being shown in FIG. 8.

A fourth gating circuit 516 may also be provided. Gating circuit 516 is normally operative as a simple inverter but will become operative as a gating circuit by connecting a suitable jumper 518 between terminals 520, 522. Thus connected, the output from circuit 516 will be a second pair of alternately occurring groups of clock pulses which are added to the gallon clock and cost clock pulse trains, these additional signals being utilized to display additional gallon and cost data when the value of each exceeds four digits, this data being contained within the carry register 308 of FIG. 4.

Figure 6:
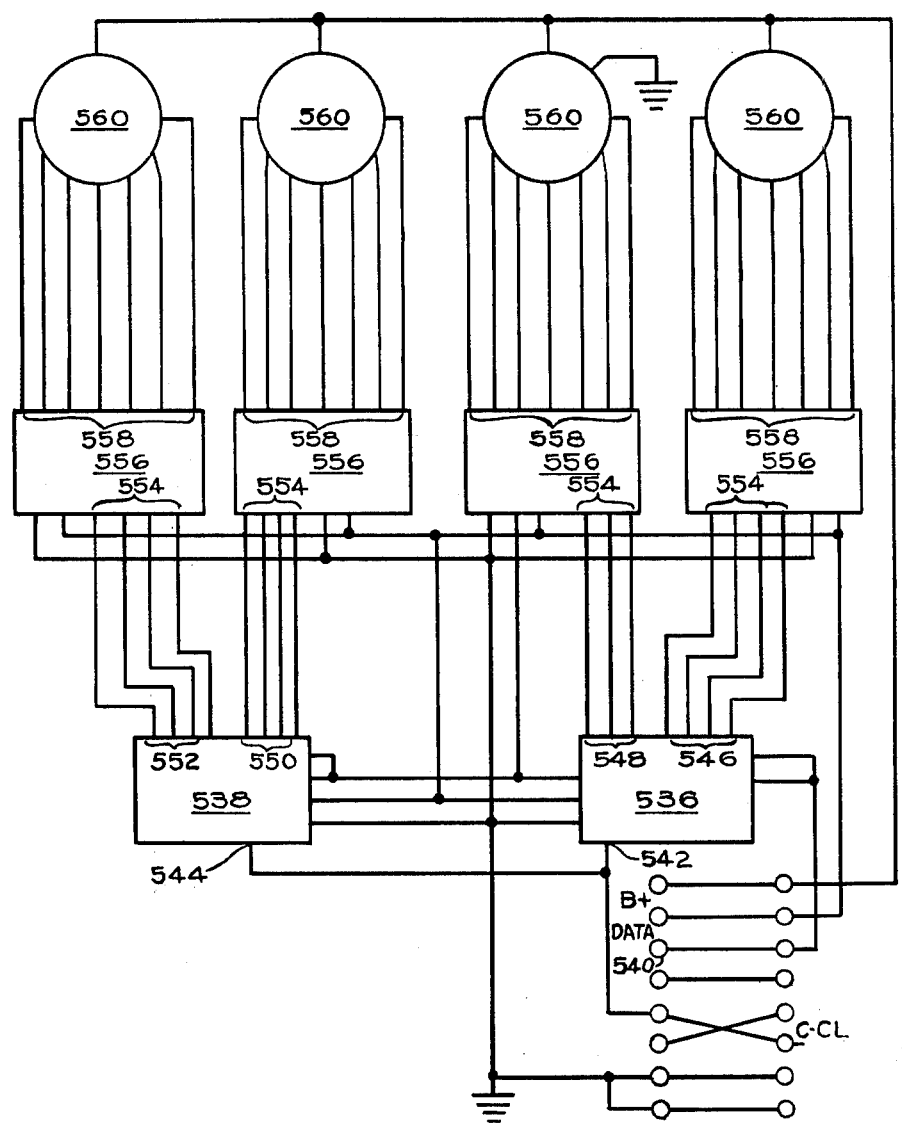
FIG. 6 is an electrical schematic of another portion of the display circuitry of the present invention.

These pulse trains are conducted by suitable means from terminals 530, 532, and 534 of the circuit of FIG. 5, respectively, to suitable display circuits for converting the serialized data to parallel data and generating a visual display thereof. The cost display, price per gallon display, and gallon display are all substantially identical in their operation and a description of one of these circuits will suffice for all. Referring now to FIG. 6, there is illustrated the cost display circuit. The circuit includes a pair of serial input-parallel output registers 536, 538. Register 536 is connected directly to input terminal 540 to receive the data pulses from the circuit of FIG. 5. Register 536 has an eight bit capacity or two decimal digit capacity. Register 538 is coupled to register 536 in cascade and accumulates data representing the third and fourth (if the latter is used) data digits. Registers 536, 538 have their clock input terminals 542, 544 coupled to terminal 532 of the circuit of FIG. 5 to receive the cost clock pulse train. Correspondingly, registers 536 and 538 will accept or shift in data bits received at terminal 540 only when cost clock signals are simultaneously applied thereto. It will be observed that the sequence of occurrence of the cost clock, gallon clock, and price per gallon clock signals corresponds exactly to the sequence of occurrance of the corresponding data in the serialized data train outputed from the circuit of FIG. 4 via conductor 410. It will thus be seen that, since the display circuit of FIG. 6 responds only when the cost clock signals occur, the data received and shifted into the registers 536, 538 will be only the cost data portion of the serialized data train or data burst from the circuit of FIG. 4.

In an identical manner, the data train is applied continuously to the gallon display circuit and price per gallon display circuits with these circuits being connected to the circuit of FIG. 5 to receive a selected one of the GAL CL, C CL or PPG CL signals and responding to and shifting in only those portions of the data train representing the gallon data, cost data, or price per gallon data, respectively, because of the correlation between the pulse trains applied thereto and the serial positioning of the data in the data burst.

Registers 536, 538 have a plurality of groups of output terminals 546, 548, 550, and 552. The output at each group of terminals is the binary coded decimal equivalent of one digit of the data contained within the registers 536, 538. This data is applied in parallel to the input terminals 554 of a plurality of suitable decoder/driver circuits 556 such as binary coded decimal to seven segment decoder/driver circuits, dot matrix decoder/drivers, Nixie tube decoder/drivers or the like. The decoder/drivers 556 receive the parallel input binary coded decimal signals and convert these to a coded signal suited to the type of display selected which in turn is applied via output terminals 558 to a plurality of display elements 560. The decoders/drivers operate continuously.

Since the data burst occurs over a period of only 4.5 milliseconds, the changing data occurring during the data burst can barely be perceived by the human eye. The data, however, remains at its last accumulated value during the idle period of 45 milliseconds between data bursts whereby the data perceived by an observer on display elements 560 appears to be continuous with only a barely perceptible flicker.

Additional display circuits such as shown in FIG. 6 or others conceivable to those skilled in the art can be coupled to the data serializing circuit of FIG. 4 and the circuit of FIG. 5 as desired to provide a visual display of the data at locations such as a console 79 (FIG. 9) at a centralized location, at individual dispenser units 50 and the like, the only limitation being the requirement to provide adequate buffering circuits, data "sorting", and decoding circuits and the like. The data can similarly be separated and inputed to the registers of a printer or the like for automatically printing a receipt or for recording thereof for permanent or centralized record keeping.

Referring again to FIG. 3, it will be recalled that a NAND gate 192 has its input terminals connected to output terminals 130 and 132 of counter 124. A NOR gate 194 is connected to the output of NAND gate 192. In operation, NAND gate 192 and NOR gate 194 generate an output signal at terminal 562 eveloping the leading edge of every fourth C-1 pulse as shown in FIG. 7.

Figure 10:
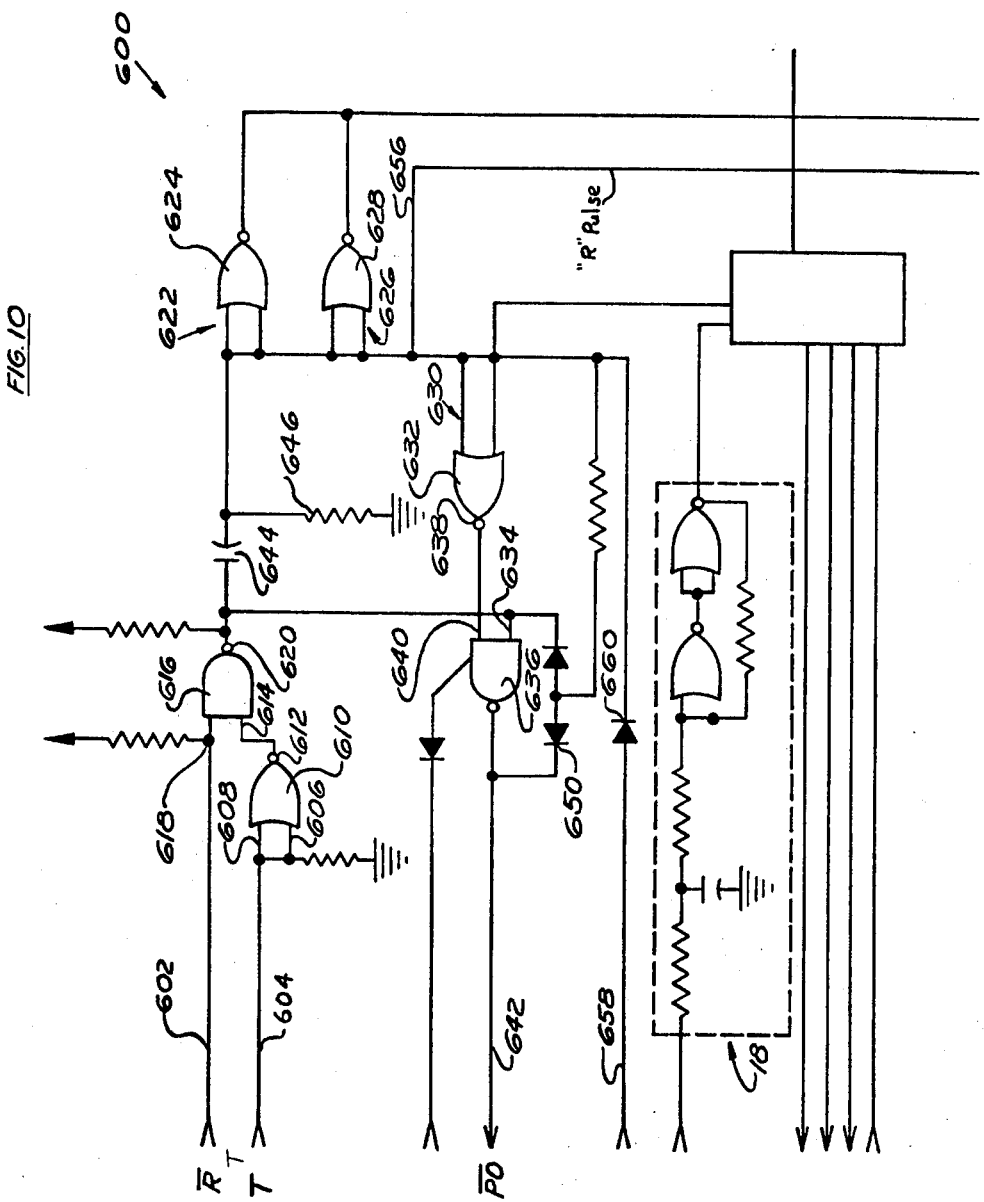
FIG. 10 is an electrical schematic of an automatic display checking circuit for use in the present invention.

Referring now to FIG. 10 there is illustrated a circuit 600 for effecting an automatic check of the operability of portions of the present invention. The circuit 600 includes input terminals 602, 604 that are coupled to suitable switches (not shown) operable in response to operation of a reset handle (also not shown) associated with the fluid dispenser and a "TILT" Switch (not shown) described below. The signal appearing at terminal 602 is normally at a logic 1 and shifts to a logic 0 in response to operation of the reset handle of the dispenser. These two signals are denoted $\bar{R}$ and T, respectively. The T signal is applied to the inputs 606, 608 of a NOR gate 610 connected to function as an inverter and the output 612 of NOR gate 610 is applied to one input terminal 614 of a NAND gate 616. The other input terminal 618 of gate 616 is coupled to input terminal 602.

Typically, at the completion of a normal dispensing cycle the dispenser nozzle (not shown) must be returned to a suitable receptacle on the dispenser necessitating operation of the reset handle (not shown) to thereby generate the logic 1 signal at the terminal 602. This in turn applies a logic 1 signal to input terminal 618 of NAND gate 616. This causes NAND gate 616 to generate a logic 0 signal at its output terminal 620 applying a logic 0 signal to the input terminals 622, 626 of parallel connected NOR gates 624, 628 and the input terminals 630 of a NOR gate 632. This logic 0 signal is also applied to input terminal 634 of a NAND gate 636. The outputs of parallel connected NOR gates 624, 628 are thus at logic 1. The output of NOR gate 632 appearing at terminal 638 thereof is, under these conditions, also at logic 1 thus placing the input terminal 640 of NAND gate 636 at logic 1 and the input at terminal 634 of NAND gate 636 at logic 0. The output of NAND gate 636 is thus at logic 1, this signal appearing at terminal 642 and being denoted as $\overline{PO}$ which denotes a "pump not on" condition.

When the reset handle (not shown) is operated causing the $\bar{R}$ signal to shift from logic 1 to logic 0, logic 0 signals are applied to input 618 of NAND gate 616 to generate a logic 1 signal at the output terminal 620 thereof. This initiates the following sequence of events: a charging current flows in capacitor 644 through resistor 646. The inputs to parallel connected NOR gates 624, 628 shift from logic 0 to logic 1 and the outputs thereof shift from logic 1 to logic 0. Similarly, the inputs to NOR gate 632 shift from logic 0 to logic 1 and the output thereof shifts to logic 0. This provides a logic 1 signal at terminal 634 and a logic 0 signal at terminal 640 of NAND gate 636 causing its output to remain at a logic 1.

As the charge on capacitor 644 builds, the signals applied to the input terminals 622, 626 of NOR gates 624, 628 and the inputs to terminals 630 of NOR gate 632 begins to decay or drop towards the threshold of these last mentioned gates. When this signal reaches the threshold of gates 624, 628 and 632, the outputs thereof shift from a logic 0 to a logic 1 state. The signal at input terminal 634 of NAND gate 636, however, remains at the logic 1 signal whereby both inputs to NAND gate 636 are at logic 1 and the output of NAND gate 636 begins to shift from a logic 1 to a logic 0. As this occurs, diode 650 becomes forward biased and resistor 652 further increases the charging speed of capacitor 644 thereby causing a positive and rapid transition of NAND gate 636 to a logic 0 output.

From the above it is seen that the output of parallel connected NOR gates 624, 628 is a negative "R" pulse (a shift from a logic 1 to a logic 0 and back to logic 1 signal) of predetermined pulse width. The $\overline{PO}$ signal is a negative step function occurring upon completion of the above-mentioned "R" pulse. The length of said "R" pulse is determined essentially by capacitor 644 and resistor 646. The output from parallel connected NOR gates 624, 628 is applied as a reset signal to the accumulators 60, 66. It will also be observed that the logic signals applied to the input terminals 622, 626 of parallel connected NOR gates 624, 628 is applied via a conductor 656 to the P/S terminals of registers 260, 272, 274 and 308 through NAND gate 322. This signal effectively locks the registers 272, 274 and 308 in their serial shift mode for the duration of the aforementioned "R" signal. This signal can be applied to terminal 658 of circuit 600, through diode 660 to the inputs of NOR gates 624, 628, etc.

The "R" pulse is, in a working embodiment of the invention, about one second in duration. The segment check signal from terminal 562 (FIG. 3) is applied to terminal 374 of NAND gate 372 (FIG. 4) and is gated through said NAND gate by the "R" pulse appearing at terminal 371 thereof for the duration of said "R" pulse. Terminal 661 of register 308 is coupled directly to ground, and terminal 261 of register 260 is coupled to $+v$. These being the serial input terminals of these registers. When the aforementioned Seqment Check signal (FIG. 7) and the "R" pulse occurs, circuit 334 is conditioned to serially output the data from registers 260, 272, 274 and 308. Registers 308 and 260, because their serial input terminals 661, 261 are coupled to ground and $+v$, respectively, have all 0's and 1's, respectively, shifted thereinto in response to C-1 pulses. After an initial brief period of time during which all of the data within registers 260, 272, 274 and 308 is "dumped", all 0's and 1's are outputed from the respective registers. The circuit 334 is now conditioned to output the Segment Check signal appearing at terminal 374 of NAND gate 372. This will be recognized as the serial binary coded decimal equivalent of all decimal 8's. These "8's" are in turn applied to the display circuits as above-described whereby all of the display circuits will display numeral "8's" energizing all seven segments of the seven segment displays, if these are used. This enables the operator to verify the operability of the display circuit of the invention. It will be observed that the "8's" are passed essentially through the entire display circuit thereby verifying the operation of the entire circuit rather than simply verifying the operability of the display elements themselves as is typically done in prior art circuits. This condition continues for a period of about 1 second (the period of the "R" pulse). When the "R" pulse again returns to a logic 0, the circuit is initialized for the normal dispensing cycle, all registers having been reset during the "R" pulse. The entire checking sequence is automatic and occurs at the outset of each normal dispensing cycle.

This same circuit also provides a means for preventing the unauthorized alteration of the settings of the price switches 20 (FIGS. 1 and 2). The price switches 20 are enclosed in a box (not shown) and a suitable "tilt" switch is affixed to the door thereof. The tilt switch is normally open and is rendered closed in response to opening of the door. This tilt switch is connected to the T input terminals 604 and 658 of the circuit 600 (FIG. 10). Correspondingly, if the door is opened by a station attendant without authorization, the signals at terminals 604, 658 shift from a logic 0 to a logic 1 irrespective of other conditions of the circuit. This logic 1 signal is inverted by NOR gate 610 and is applied as a logic 0 signal to NAND gate 616. The shift of the signal in terminal 604 will cause a logic 1 signal to be generated at output terminal 620 of NAND gate 616 thereby generating, as explained above, a reset signal. This reset signal is, by appropriate connections, immediately applied to all of the dispensers in the system causing the same to display "8's". The reset condition caused by the "T" signal is maintained for the duration of the "T" signal via conductor 658 which over rides the "R" pulse timing circuit. Occurrence of the "T" signal also effects the removal of a control signal to the dispenser flow control valve (not shown) to terminate dispensing. The same reset signal can also be utilized to energize a suitable audible alarm or the like thereby notifying or alerting the operator of the station that an unauthorized person has opened the box containing the price switches 20.

Figure 11:
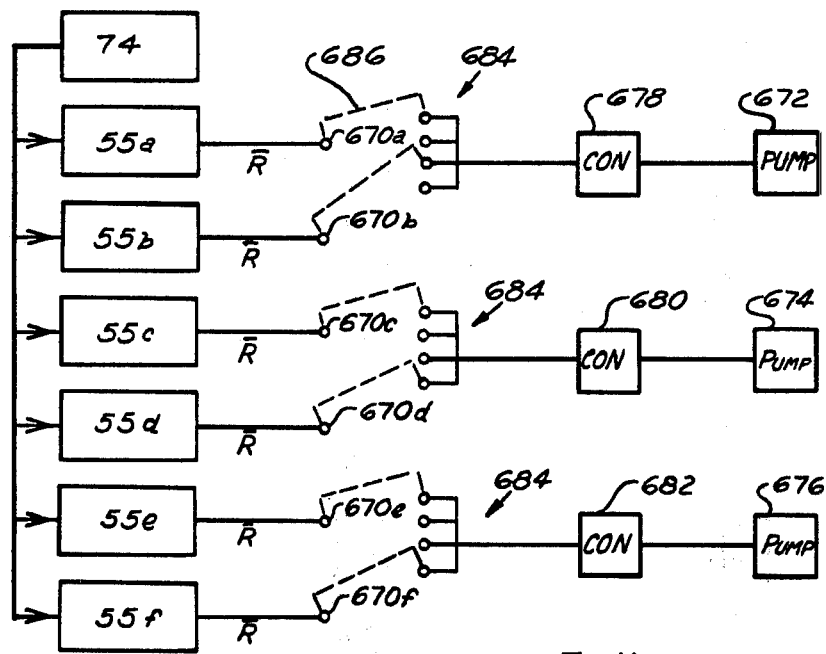
FIGS. 11 and 12 are simplified electrical diagrams showing a pump selecting circuit for use in multiple dispenser installations of the present invention.

Referring now to FIG. 11, there is illustrated an additional feature of the fluid dispenser of the present invention wherein, as is typical, a plurality of fluid dispensers are provided at a single facility. For example, the facility may include a total of six dispensers having six assemblies 55a, 55b, 55c, 55d, 55e, and 55f, there being one for each dispenser in the system. A single sequence control circuit 74 is required for all of the assemblies 55a through f. A suitable R̄ output is shown associated with each of the assemblies 55a through 55f. Actually the R̄ signals are derived from those portions of the circuit shown in FIG. 10 and are only shown coming from the assemblies 55a through 55f for convenience in FIG. 11. Associated with each of the R̄ outputs in FIG. 11 is a suitable connector 670a, 670b, 670c, 670d, 670e, and 670f. Also associated with the station facility are three submersible fluid pumps 672, 674 and 676. In a typical installation, the facility will typically have only two or three large fluid reservoirs or tanks, one for each type of fluid dispensed at the station. For example, a single station may dispense regular grade gasoline, premium grade gasoline, and "no lead" gasoline. A single submersible type pump 672, 674 or 676 is associated with each of the reservoirs and each is connected to selected ones of the dispensers 55a through 55f utilized to dispense a particular type of fluid. The pumps 672 through 676 are each rendered operative via a suitable pump control such as control 678, 680 or 682. Each of the controls 678 through 682 also has associated therewith a plurality of connectors as at 684. By utilizing suitable jumper elements as indicated by dashed lines at 686, any one of the pumps 672 through 676 can be operatively coupled to any desired one of the dispensers, display modules and the like at the facility. This eliminates the need for a separate pump for each fluid dispenser, separate pump controls for each of the dispenser circuits, and permits the simple adaptation of the system to pump a desired type of fluid from different ones of the dispensers in accordance with the layout of the station or facility.

Figure 12:
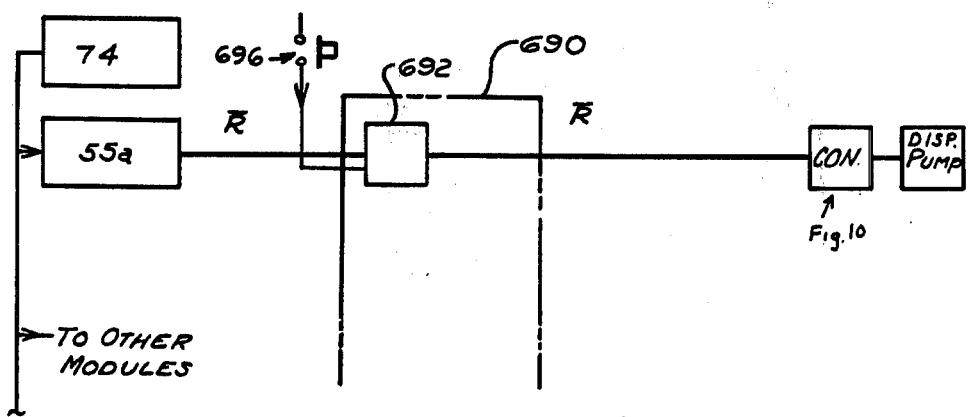

Referring now to FIG. 12, it is also possible to adapt the system for self-service operation. In this instance, the R̄ signal is routed to a central console 690 which may be situated within the station house or the like (not shown). Normally the R̄ signal would, after the initial reset cycle and segment check, initiate or condition the system for dispensing fluid. In a self-service facility, the signal is applied to a simple latch circuit 692 which will alert an operator that a customer wishes to dispense fluid from a particular dispenser. The system remains in this condition until the operator manually depresses an enable button on the console for the particular dispenser thereby passing the R̄ signal to the dispenser reset circuitry 600. Upon completion of the dispensing cycle, the customer will operate the reset handle. A subsequent dispensing cycle would normally pass the R̄ signal into the dispenser circuitry to reset the same. In the self-service facility, however, the R̄ signal is again applied to a latch circuit 692 and held until the operator manually depresses a suitable switch 696 to again pass the R̄ signal to the reset circuitry (FIG. 10). This, of course, is not done until the operator has recorded the transaction. In this facility, the utilization of a patch board for associating a particular pump and control with a particular dispenser can also be used.

From the above description it will be seen that the digital electronic data system disclosed provides a substantially simplified computing circuit for computing cost, quantity dispensed and the like data and automatically and continuously serializes this data and transmits the same via a single transmission means to one or a plurality of display circuits. Because of the serializing portions of the circuit, the number of wires required to be interconnected between remotely located dispensers, display consoles and the like is minimized. The circuit permits simplified alteration of the unit volume price for the dispensers in the system. Complicated mechanical assemblies, value registers and the like are eliminated. All alterations in the circuit such as altering the price per unit volume are performed by simple multiple position electrical switches. The circuit permits accurate round off of data to a proper half cent and substantially increases the accuracy of the dispenser. All control switches for varying price per gallon and the like can be located at a remote location which may be located within a station house or the like. Since the circuit is entirely electronic and mechanical linkages between components of the dispenser are substantially reduced, ornamental design and configuration of the dispenser is not longer limited to the traditional pedestal dispenser. The digital electronic circuitry of the invention also permits simplified interfacing of the dispenser with other electronic equipment such as a receipt printing cash register or other large data processing units. The circuit utilizes integrated circuits throughout thereby providing minimum power consumption, high reliability, and minimal space. Substantially all components of the system are standard off the shelf components.

While there have been described above the principles of this invention in connection with specific apparatus, it is to be clearly understood that this description is made only by way of example and not as a limitation to the scope of the invention.

What is claimed is:

1. A data system for use in a fluid dispenser for producing an output signal corresponding in direct proportion to the accumulative cost of the fluid dispensed dependent upon a a variable preset signal representative of a price for each unit volume of fluid actually dispensed, the combination comprising:
   a. pulse generator means coupled to said dispenser for generating an enabling pulse for each predetermined fraction of a unit quantity of liquid dispensed;
   b. oscillator means operable between an idle condition and an activated condition in response to a disabling pulse and said enabling pulse, respectively, for generating a burst of pulses in response to said enabling pulse;
   c. presettable switch means manually movable through a plurality of positions for generating continuously a coded signal of varying weight proportional to the selected price for each unit volume of fluid;
   d. registry means connected to said presettable switch means to receive said coded signal and to said oscillator means to receive said burst of pulses for producing said disabling pulse when the number of said oscillator means burst of pulses is equal to said coded signal; and
   e. counting means including dividing means connected to said oscillator means to receive said number of said burst of pulses for dividing said number of pulses by said predetermined fraction of a unit quantity to generate an output signal proportional to the accumulated cost of said increment of fluid dispensed.

2. The combination of claim 1, wherein said oscillator means includes an input control gate to implement said activated condition to concurrently connect said oscillator means output to said registry means and to said counting means upon being enabled by said enabling pulse and to return said oscillator means to said idle condition in response to said disabling pulse.

3. The combination of claim 2, wherein said oscillator means further comprises a pulser as a source of said enabling pulses.

4. The combination of claim 3, wherein said pulser comprises an astable multivibrator to emit said burst of pulses upon being enabled by said input control gate.

5. The combination of claim 2, wherein said input control gate includes combinational logic elements connected in an RS flip-flop configuration.

6. The combination of claim 1, wherein said presettable switch means further comprises a plurality of switches coupled between a source of direct current voltage and said registry means for continuously setting said registry means with a plurality of binary coded signals.

7. The combination of claim 6, wherein said registry means comprises a presettable counter and wherein said presettable switch means is selectively operable for presetting said counter with said binary coated signals for each place of said set price for each unit volume of fluid dispensed and operable for producing an output feedback pulse when the relative weight of the output of said oscillator means corresponds directly the amount encoded by said presettable switch means.

8. The combination of claim 1, wherein said counting means includes a circuit to electronically reset said counting means to its zero count state in response to the initiation of a dispensing sequence.

9. The combination of claim 1 wherein said coded signal is a static direct current signal for the duration of a dispensing sequence.

10. A data system for use in a fluid dispenser for dispensing a quantity of fluid, said dispenser including means for generating an electrical signal in response to each incremental quantity of fluid dispensed, the combination comprising:
   a. manually settable static register means for generating static unit price signals;
   b. computing means coupled to said signal generating means and to said static register means to receive said electrical signals and said static unit price electrical signal for generating an incremental cost signal in response thereto;
   c. volume register means and cost register means connected to receive and accumulate said incremental volume and cost signals, respectively, for generating accumulated volume and cost signals, respectively;
   d. gated-clock means operative between an idle state and an active state for generating clock pulse signals;
   e. sequence control means coupled to said gated-clock means for controling the operation thereof between said active and idle states to generate a predetermined number of said clock pulses at predetermined time intervals;
   f. data transfer means including at least one data transfer register and being coupled to said static unit price, volume and cost register means and to said gated-clock means for receiving said clock pulses, said static price signals and said accumulated volume and cost signals, respectively and transmitting said static unit price, accumulated volume, and cost signals through a transmitting medium in a predetermined sequence; and
   g. data display means connected to said data transfer means and to said gated-clock means through said transmitting medium for receiving said unit price, accumulated volume, and cost signals in synchronism with the transmission thereof, and generating a visible display thereof.

11. The system of claim 10 wherein said accumulated volume and cost registers include means for serially receiving said incremental volume and cost signals, respectively, said accumulated volume and cost signals being binary coded decimal signals corresponding thereto.

12. The system of claim 11 wherein said last mentioned binary coded decimal signals each include a plurality of digits, said accumulated volume and cost registers further including means responsive to said sequence control means for outputing predetermined ones of said plurality of digits one at a time in a predetermined sequence.

13. The system of claim 12 wherein said transfer register includes means for sequentially receiving one each of said predetermined ones of said binary coded decimal accumulated volume and cost signals and serially outputing the same in sequence.

14. The combination of claim 12 further including means for automatically indexing said accumulated volume and cost registers to maintain a selected digit sequence of the data outputed therefrom.

15. The system of claim 11 wherein said static unit price signals include a plurality of binary coded decimal signals corresponding to individual ones of the decimal digits of said unit price, said data transfer means further including at least one unit price register means coupled to receive said binary coded unit price signals for serially outputting the same in response to predetermined ones of said clock pulse signals.

16. The system of claim 15 wherein said unit price register includes means for simultaneously receiving all of said binary coded decimal static unit price signals and outputing the same in sequence.

17. The system of claim 14 further including gating means coupled to said transfer register and said unit price register to receive said serialized data therefrom, said gating means further being coupled to said sequence control means and being responsive to signals therefrom for controlling the transfer of said data.

18. The apparatus of claim 17 wherein said gating means includes a plurality of combinational logic elements logically connected to transmit selected ones of said serialized accumulated volume, cost, and said unit price data signals.

19. The system of claim 10 wherein said sequence control means includes means for generating a plurality of sequence control signals at predetermined time intervals and of predetermined time durations, said volume, cost and unit price registers, said clock pulse generating means and said data dransfer means being coupled to said sequence control means to receive predetermined ones of said sequence control signals and being operatively responsive thereto between a plurality of operating conditions.

20. The apparatus of claim 10 wherein said transmitting medium is a single electrical conductor extending between said data transfer means and said data display means.

21. The combination of claim 20 further including a plurality of said data display means and a plurality of said transmitting media, each of said data display means being connected to said data transfer means through individual ones of said transmitting media.

22. The combination of claim 20 wherein said data display means further includes clock pulse separating means connected to said gated-clock means to receive said clock pulse signals for generating a plurality of non-simultaneously occurring data clock pulse trains in response thereto.

23. The combination of claim 22 wherein said data clock pulse trains include a gallons pulse train, a cost pulse train, and a price per unit volume pulse train, said data display means further including a gallons register, cost register, and price per unit volume register, all said last mentioned registers being connected to said data transfer means to receive said unit price, accumulated volume, and cost signals, said volume register, cost register, and price per unit volume registers being connected to said clock pulse separating means to receive said gallons, cost, and price per unit volume pulse trains, respectively, and being responsive thereto to accept said accumulated volume, cost and said price per unit volume signals, respectively, and further including a plurality of decoder/driver means connected thereto for generating coded signals corresponding thereto.

24. The combination of claim 23 wherein said data display means further includes a plurality of groups of luminescent display elements, individual ones of said groups of display elements being connected to individual ones of said decoder/driver means, said groups of display elements generating a luminescent decimal display of the data within said data display registers.

25. The combination of claim 22 wherein said data clock pulse separating means includes a binary counter connected to said transmitting medium to receive said clock pulse signals and a plurality of logic gates connected to said binary counter and to said transmitting medium, said logic gates being responsive to the output of said binary counter for outputting predetermined ones of said clock pulse trains to individual ones of a plurality of output terminals, said data clock pulse trains being said predetermined groups of said clock pulse signals.

26. The combination of claim 10 wherein said sequence control means includes means for rendering said gated-clock means operative to generate a burst of said clock pulse signals including a predetermined number thereof, and means for rendering said gated-clock means idle for a predetermined period of time between said bursts.

27. The combination of claim 26 wherein said means for rendering said gated-clock means operative includes a binary counter and a plurality of combinational logic elements connected thereto for generating a plurality of control signals in response to the occurrence of predetermined binary states of said binary counter.

28. The combination of claim 26 wherein said means for rendering said gated-clock means idle includes a timing circuit operatively connected to said gated-clock means.

29. The combination of claim 28 wherein said timing circuit is a capacitive charging circuit.

30. The combination of claim 10 wherein said data display means includes means connected to said transmitting medium and to said gated-clock means to receive said accumulated cost, and volume signals and said static price signals and producing a printed record thereof.

31. The combination of claim 30 wherein said printed record producing means is a printing cash register.

32. The combination of claim 30 wherein said printed record producing means is a receipt printer.

33. The combination of claim 10 wherein said data display means are situated in said fluid dispenser, said computing means, volume register means, gated-clock means, sequence control means, and data transfer means being situated remotely therefrom.

34. The combination of claim 33 further including a console data display means situtated remotely from said fluid dispenser.

35. The combination of claim 34 further including display circuit checking means for automatically injecting into and causing said display circuit to transmit and display predetermined indicia to thereby verify operation thereof.

36. The combination of claim 35 wherein said manually settable static register means is enclosed in a selectively openable enclosure, said enclosure including switch means operatively coupled thereto and operative between conductive and non-conductive states in response to opening of said enclosure, said display checking means further including means coupled to said switch means for generating said reset signal, said display means displaying all decimal 8's in response thereto.

37. The combination of claim 34 wherein said sequence control means includes means for generating a periodic checking control signal, said display checking means including means for generating a reset signal of predetermined time duration, said data transfer means being coupled to said control means and to said display checking means through a plurality of combinational logic elements, said data transfer means outputing therefrom through said transmitting medium a predetermined signal in response to each simultaneous occurrence of said checking, reset, and clock pulse signals.

38. The combination of claim 37 wherein said predetermined signal causes said data transfer means to output serial binary coded signals corresponding to decimal 8's.

39. The combination of claim 10 wherein there are a plurality of said fluid dispensers, a plurality of fluid reservoirs, a fluid pump associated with each said reservoir, control means operatively coupled to each said pump, and coupling means for operatively coupling a selected one of said controls and thereby said pumps for operation with selected ones of said dispensers.

40. The combination of claim 39 wherein said plurality of said pumps and said pump control means are fewer in number than said plurality of dispensers, said coupling means including a patch panel, said patch panel including a plurality of first socket elements electrically connected to individual ones of said pump control means, a plurality of second socket elements electrically connected to individual ones of said dispensers, and connector means for selectively electrically connecting selected ones of said first socket elements to selected ones of said second socket elements.

41. The combination of claim 39 further incluing a self-service operator's console, said console including means for controling the initiation of a dispensing cycle and means for preventing the resetting of said dispenser display circuit at the initiation of a subsequent dispensing cycle to thereby permit recording data therefrom.

* * * * *